United States Patent
Kim et al.

(10) Patent No.: US 9,218,518 B2
(45) Date of Patent: Dec. 22, 2015

(54) METHOD OF OPERATING CONTACTLESS IC CARD READER, DETECTION CIRCUIT OF CONTACTLESS IC CARD READER, CONTACTLESS IC CARD READER AND CARD SYSTEM INCLUDING THE SAME

(71) Applicants: Jun-Ho Kim, Hwaseong-si (KR); Hyoung-Hwan Roh, Hwaseong-si (KR); Il-Jong Song, Yongin-si (KR)

(72) Inventors: Jun-Ho Kim, Hwaseong-si (KR); Hyoung-Hwan Roh, Hwaseong-si (KR); Il-Jong Song, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/206,276

(22) Filed: Mar. 12, 2014

(65) Prior Publication Data
US 2014/0263643 A1    Sep. 18, 2014

(30) Foreign Application Priority Data
Mar. 13, 2013 (KR) ........................ 10-2013-0026722

(51) Int. Cl.
*G06K 19/06* (2006.01)
*G06K 7/08* (2006.01)
*G06K 7/10* (2006.01)

(52) U.S. Cl.
CPC ............ *G06K 7/083* (2013.01); *G06K 7/10039* (2013.01)

(58) Field of Classification Search
USPC .......................... 235/492, 439, 451
See application file for complete search history.

(56) References Cited

U.S. PATENT DOCUMENTS

| | | | |
|---|---|---|---|
| 6,905,074 B2 * | 6/2005 | Charrat | .......................... 235/492 |
| 7,148,804 B2 | 12/2006 | Salesky et al. | |
| 7,405,659 B1 | 7/2008 | Hyde | |
| 7,917,088 B2 | 3/2011 | Hyde et al. | |
| 8,050,651 B2 | 11/2011 | Kawabata et al. | |
| 8,125,317 B2 | 2/2012 | Yoon et al. | |
| 8,129,942 B2 | 3/2012 | Park et al. | |
| 8,174,364 B2 | 5/2012 | Pedigo | |
| 2009/0066482 A1 | 3/2009 | Kim | |
| 2012/0083205 A1 | 4/2012 | Marcu et al. | |

FOREIGN PATENT DOCUMENTS

| | | |
|---|---|---|
| KR | 10-2004-0009447 A | 1/2004 |
| KR | 10-2004-0107265 A | 12/2004 |
| KR | 10-2006-0088915 A | 8/2006 |
| KR | 10-2011-0002328 A | 1/2011 |

* cited by examiner

*Primary Examiner* — Christle I Marshall
(74) *Attorney, Agent, or Firm* — Lee & Morse, P.C.

(57) ABSTRACT

A method of operating a contactless integrated circuit (IC) card reader includes calculating a first transition time of at least one first magnetic pulse during a first transition interval and calculating a second transition time of a second magnetic pulse during a second transition interval. The first transition time is calculated in a calibration phase, and the second transition time is calculated in a detection phase. A contactless IC card is determined to be within a communication rage of the reader based on a comparison of the first and second transition times.

30 Claims, 18 Drawing Sheets

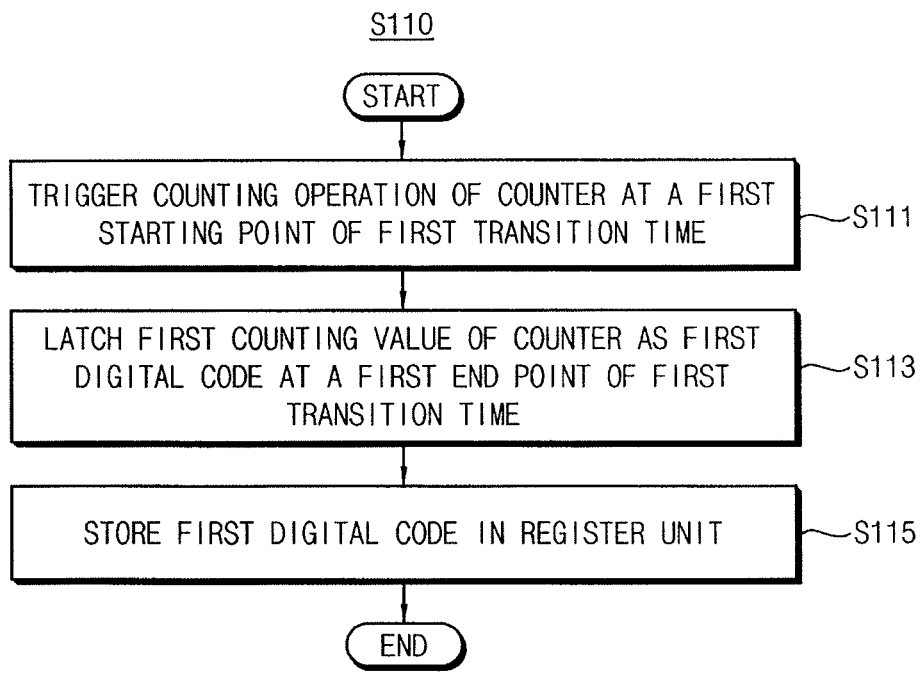
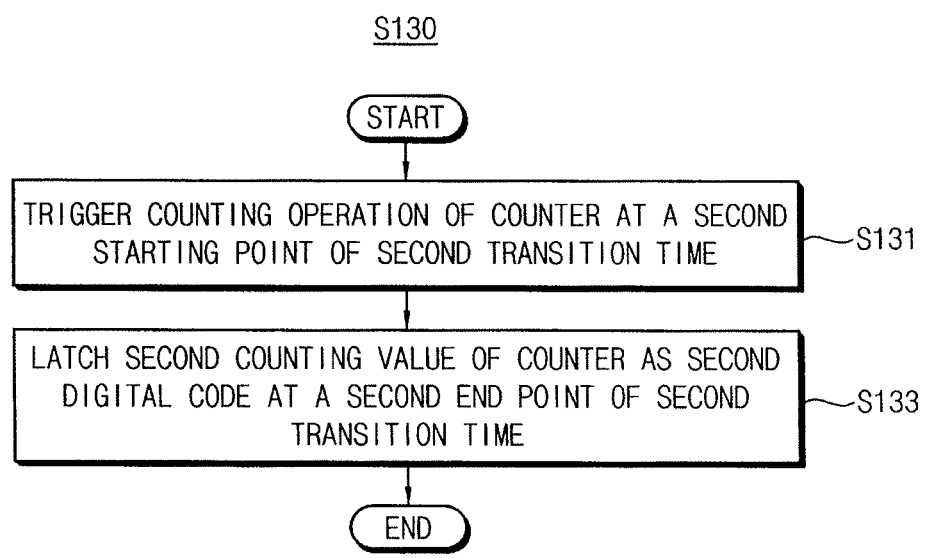

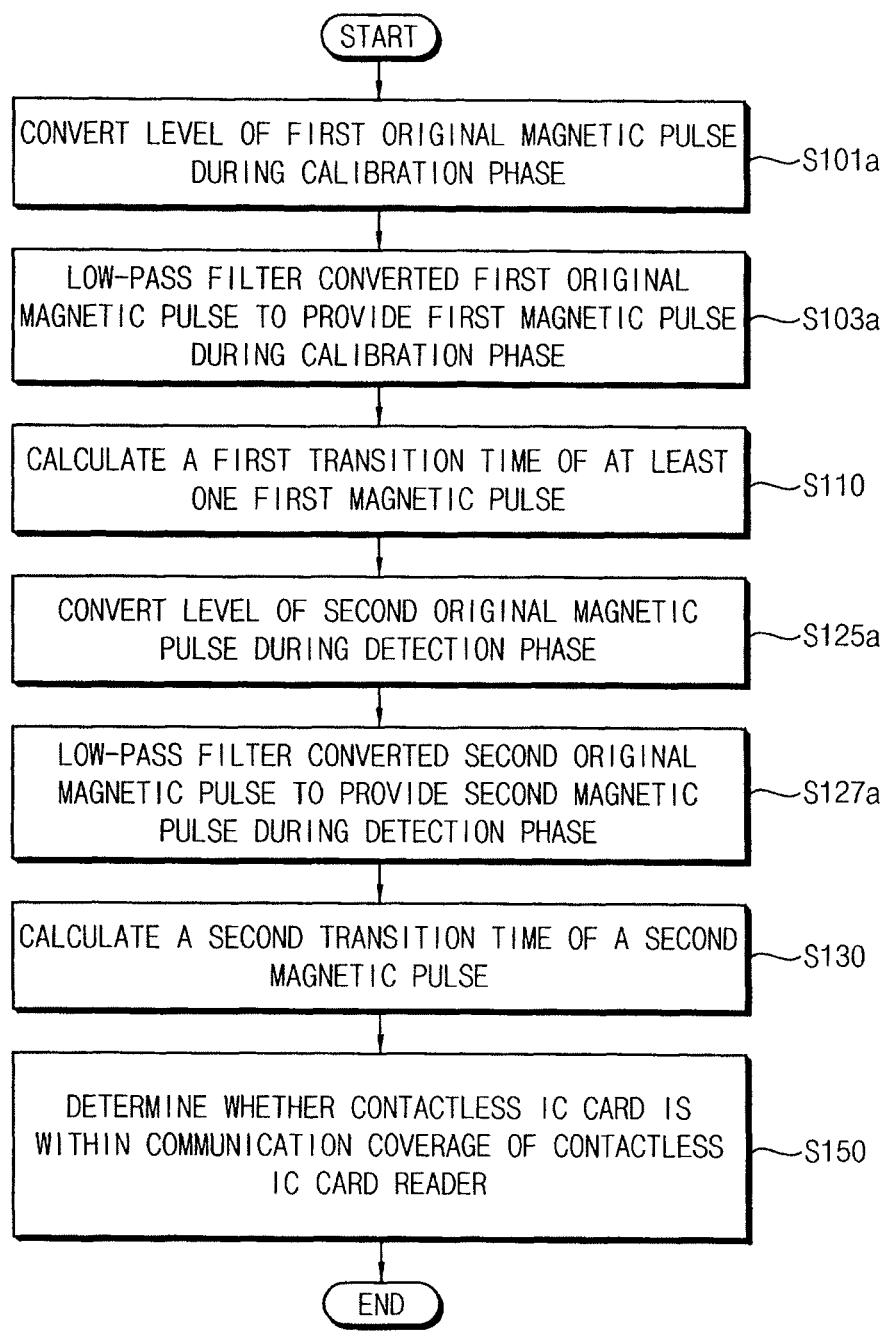

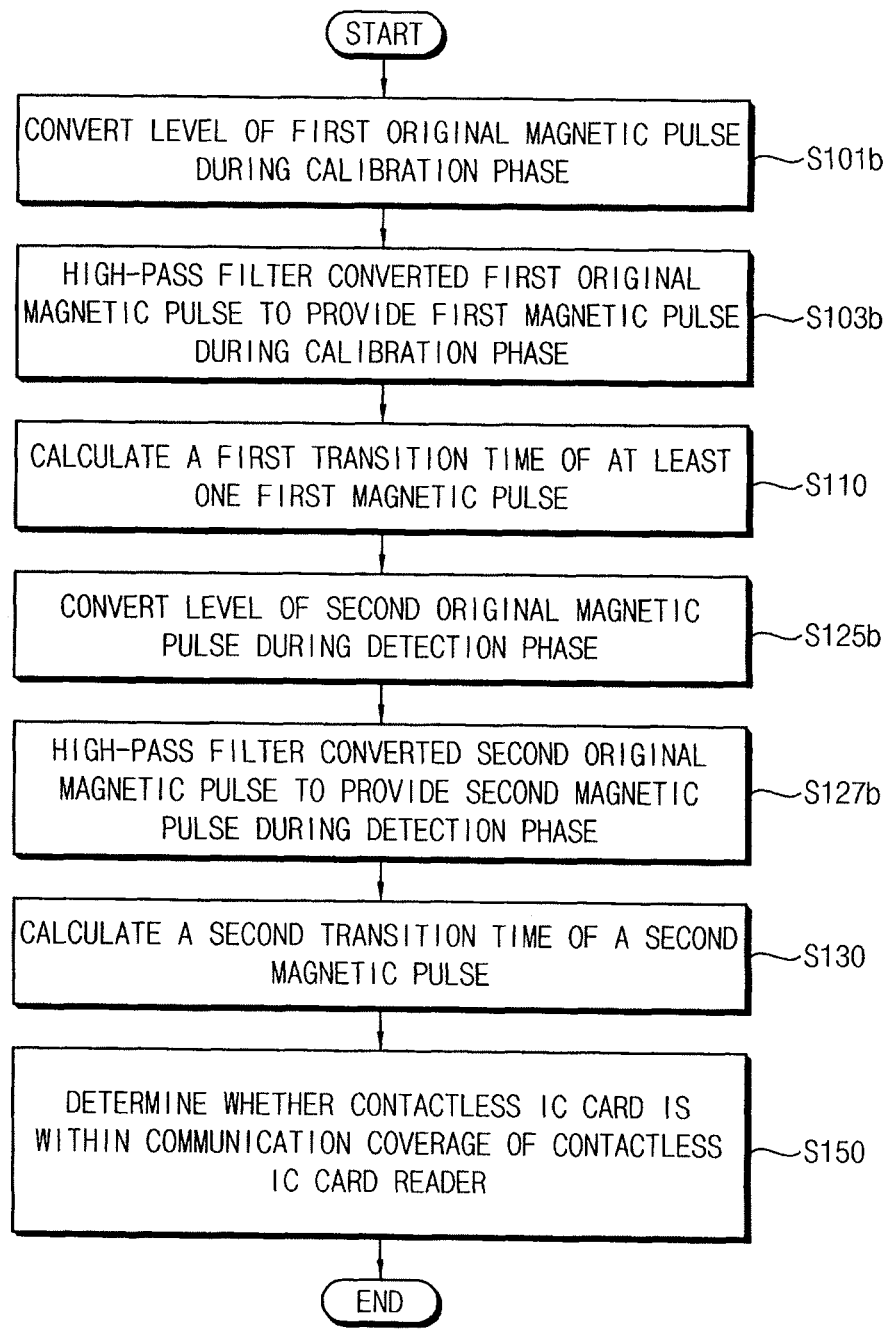

METHOD OF OPERATING CONTACTLESS IC CARD READER, DETECTION CIRCUIT OF CONTACTLESS IC CARD READER, CONTACTLESS IC CARD READER AND CARD SYSTEM INCLUDING THE SAME

CROSS-REFERENCE TO RELATED APPLICATION

Korean Patent Application No. 10-2013-0026722, filed on Mar. 13, 2013, and entitled: "Method Of Operating Contactless IC Card Reader, Detection Circuit Of Contactless IC Card Reader, Contactless IC Card Reader and Card System Including The Same," is incorporated by reference herein in its entirety.

BACKGROUND

1. Field.

One or more embodiments relate to a contactless IC card reader.

2. Description of the Related Art

Various types of integrated circuit (IC) cards have been proposed. One type of IC card includes a plastic card to which a thin semiconductor device is attached. The card may have a size and thickness similar to a credit card. Typically, an IC card provides a higher level of security than a magnetic striped card and does not readily lose stored data.

IC cards may be classified as contact IC cards or contactless IC cards. Contactless IC cards may be classified as Contactless IC Cards (CICC) or Remote Coupling Communication Cards (RCCC). For CICC IC cards, a communication range is from 0 to 2 mm at a carrier frequency of 4.9157 MHz. For RCCC cards, a communication range is from 0 to 10 cm at a carrier frequency of 13.56 MHz.

SUMMARY

In accordance with one embodiment, a method of operating a contactless integrated circuit (IC) card reader includes calculating a first transition time of at least one first magnetic pulse during a first transition interval, the at least one first magnetic pulse having a first level and a reference level during the first transition interval in a calibration phase; calculating a second transition time of a second magnetic pulse during a second transition interval, the second magnetic pulse having a second level and the reference level in the second transition interval in a detection phase; and determining whether a contactless IC card is within a communication range of the contactless IC card reader based on a comparison of the first and second transition times.

Calculating the first transition time may include triggering a counting operation at a first staring point of the first transition interval; latching a first counting value as a first digital code at a first ending point where the first transition interval reaches the reference level; and storing the first digital code in a register.

Calculating the second transition time may include triggering a counting operation at a second staring point of the second transition interval; and latching a second counting value as a second digital code at a second ending point where the second transition interval reaches the reference level.

Determining whether the contactless IC card is within the communication range of the contactless IC card reader may include comparing the first digital code and the second digital code; and providing a detection signal based on the comparison of the first digital code and the second digital code, the detection signal indicating whether the contactless IC card is within the communication range of the contactless IC card reader. The first and second digital codes may correspond to a number of counting pulses during the first and second transition times, respectively. The method may also include adjusting a period of the counting pulses.

An operation mode of the contactless IC card reader may be determined based on the determination of whether the contactless IC card is within the communication range of the contactless IC card reader. The method may further include changing the operation mode of the contactless IC card reader from a standby mode to an active mode when the contactless IC card is determined to be within the communication range.

The at least one first magnetic pulse includes a plurality of first magnetic pulses, and calculating the first transition time comprises: calculating a first sub-transition time from the first level to the reference level of each of the plurality of first magnetic pulses; and averaging the first sub-transition times to provide an average value corresponding to the first transition time. The method may further include determining an offset based on the average value of the first sub-transition times, the offset corresponding to error range of the first sub-transition times.

The at least one first magnetic pulse may include a plurality of first magnetic pulses. Calculating the first transition time may include calculating a first sub-transition time from the first regular level to the reference level of each of the plurality of first magnetic pulses; and providing a range of the first transition time based on distributions of the first sub-transition times.

Determining whether the contactless IC card is within the communication range of the contactless IC card reader may comprise determining whether the second transition time is within the range of the first transition time.

The method may include generating the at least one first magnetic pulse based on at least one first original magnetic pulse transmitted through an antenna in the calibration phase, and generating the second magnetic pulse based on at least one second original magnetic pulse transmitted through the antenna in the detection phase, wherein the first level corresponds to a peak level of the first magnetic pulse, and wherein the second level corresponds to a peak level of the second magnetic pulse.

The method may include converting a level of the first original magnetic pulse in the calibration phase; and filtering the level-converted first original magnetic pulse to provide the first magnetic pulse.

The method may include generating the at least one first magnetic pulse based on at least one first original magnetic pulse transmitted through an antenna in the calibration phase, and generating the second magnetic pulse based on at least one second original magnetic pulse transmitted through the antenna in the detection phase, wherein the first level corresponds to a bottom level of the first magnetic pulse, and wherein the second level corresponds to a bottom level of the second magnetic pulse.

The method may include converting a level of the second original magnetic pulse in the detection phase; and filtering the level-converted second original magnetic pulse to provide the second magnetic pulse.

In accordance with another embodiment, a detection circuit of a contactless integrated circuit (IC) card reader includes a first calculation unit and a determination unit. The first calculation unit is configured to calculate a first transition time of at least one first magnetic pulse during a first transition interval, the at least one first magnetic pulse having a first level and a reference level in the first transition time, the first calculation unit to latch a first digital code corresponding to the first transition time in a calibration phase, and calculate a second transition time of a second magnetic pulse during a second transition interval, the second transition time having a second level and the reference level during the second transition time, the first calculation unit to latch a second digital code corresponding to the second transition time in a detection phase. The determination unit is configured to output a detection signal based on a comparison of the first and second transition times. The detection signal indicates whether a contactless IC card is within a communication range of the contactless IC card reader.

The first calculation unit may comprise a level detector configured to activate a trigger signal at points where the levels of the first and second magnetic pulses transition; a comparator configured to compare the reference level with each of the first and second magnetic pulses to output a comparison signal; a counter configured to perform a counting operation during the first transition interval and the second transition interval to provide first and second counting values, respectively; and a latch configured to latch the first and second counting values as the first and second digital codes, respectively in response to a transition of the comparison signal.

The determination unit may include a second calculation unit configured to calculate an average value, an offset, and a range of a first sub-digital codes based on the first sub-digital codes corresponding to first sub-transition times of a plurality of first magnetic pulses; a register unit configured to store the first digital code, the average value, the offset, and the range of the first sub digital codes; and a digital comparator configured to compare the second digital code with one of the first digital code, the average value, or the range of the first sub-digital codes to provide the detection signal.

The detection circuit may include a regeneration block configured to convert a level of a first original magnetic pulse and configured to filter the level-converted first original magnetic pulse to provide the first magnetic pulse in the calibration phase, wherein the regeneration block is further configured to convert a level of a second original magnetic pulse and configured to filter the level-converted a second original magnetic pulse to provide the second magnetic pulse in the detection phase, and wherein the first original magnetic pulse is transmitted periodically through an antenna, and the second original magnetic pulse is transmitted through the antenna.

The first level may correspond to a peak level of the first magnetic pulse, and the second level may correspond to a peak level of the second magnetic pulse.

The first level may correspond to a bottom level of the first magnetic pulse, and the second regular level may correspond to a bottom level of the second magnetic pulse.

In accordance with another embodiment, a contactless integrated circuit (IC) card reader includes a detection circuit configured to generate a detection signal based on a comparison of a first transition time of a first magnetic pulse during a first transition and a second transition time of a second magnetic pulse during a second transition interval; and a processor configured to determine an operation mode of the contactless IC card reader, the operation mode corresponding to one of a standby mode or an active mode. The first magnetic pulse has a first level and a reference level during the first transition time in a calibration phase. The second magnetic pulse has a second level and the reference level during the second transition time in a detection phase. The detection signal indicates whether a contactless IC card is within a communication range of the contactless IC card reader. The second magnetic pulse has an amplitude that varies according to whether the contactless IC card is within the communication range of the contactless IC card reader. The processor may adjust the reference level.

In accordance with another embodiment, a contactless integrated circuit (IC) card system includes a contactless IC card; and a contactless IC card reader configured to exchange data with the contactless IC card within a communication range, the contactless IC card reader comprising: a detection circuit configured to generate a detection signal based on a comparison of a first transition time of a first magnetic pulse during a first transition and a second transition time of a second magnetic pulse during a second transition interval; and a processor configured to determine an operation mode of the contactless IC card reader, the operation mode corresponding to one of a standby mode or an active mode.

The first magnetic pulse has a first level and a reference level during the first transition time in a calibration phase. The second magnetic pulse has a second level and the reference level during the second transition time in a detection phase. The detection signal indicates whether a contactless IC card is within a communication range of the contactless IC card reader. The second magnetic pulse has an amplitude that varies according to whether the contactless IC card is within the communication range of the contactless IC card reader.

In accordance with another embodiment, a method for performing contactless detection of information includes determining a first transition time of at least one first magnetic pulse; determining a second transition time of a second magnetic pulse; and determining whether an information carrier is within a communication range of a contactless reader based on the first and second transition times. The information carrier may include an integrated circuit coupled to a card.

The at least one first magnetic pulse may change from a first level to a second level within the first transition time, and the second magnetic pulse changes from the first level to a third level within the second transition time, the information carrier determined to be within the communication range of the contactless reader based on a difference between the second and third levels.

The first transition time may be determined during a calibration phase, and the second transition time may be determined during a detection phase. Also, the method may include changing a mode of operation of the contactless reader when the information carrier is within the communication range of the contactless reader.

BRIEF DESCRIPTION OF THE DRAWINGS

Features will become apparent to those of skill in the art by describing in detail exemplary embodiments with reference to the attached drawings in which:

FIG. 3 illustrates an operation of calculating a first transition time in FIG. 2;

FIG. 4 illustrates an operation of calculating a second transition time in FIG. 2;

FIG. 9 illustrates another embodiment of operating a contactless IC card reader;

FIG. 10 illustrates another embodiment of a method for a contactless card reader;

DETAILED DESCRIPTION

Figure 1:
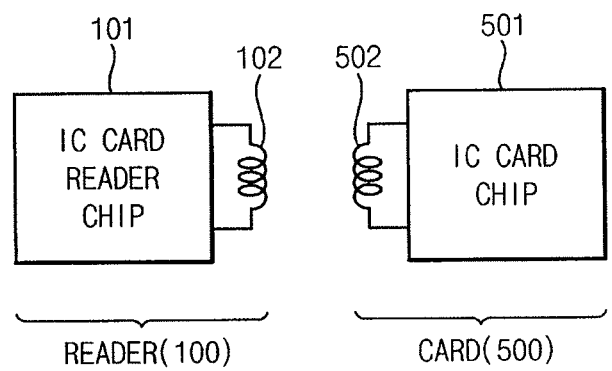
FIG. 1 illustrates an embodiment of a contactless IC card system.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

FIG. 1 illustrates an embodiment of a contactless IC card system 10 which includes a contactless IC card reader 100 and a contactless IC card 500. The contactless IC card reader 100 includes a reader chip 101 and a first antenna 102. The contactless IC card 500 includes a card chip 501 and a second antenna 502. The contactless IC card reader 100 and the contactless IC card 500 exchange data through the first and second antennas 102 and 502. The contactless IC card 500 may accept a receiving voltage from the first antenna 102 through the second antenna 502.

The contactless IC card reader 100 determines whether the contactless IC card 500 is within communication coverage (or range) of the contactless IC card reader 100 using short magnetic pulses and changes an operation mode of the contactless IC card reader 100 based on the determination. When the contactless IC card 500 is determined to be out of the communication coverage, the contactless IC card reader 100 operates in a standby mode. Thus, the contactless IC card reader 100 may minimize current consumption. When the contactless IC card 500 is determined to be within the communication coverage (or range), the contactless IC card reader 100 changes to an active mode to exchange data with the contactless IC card 500.

Figure 2:
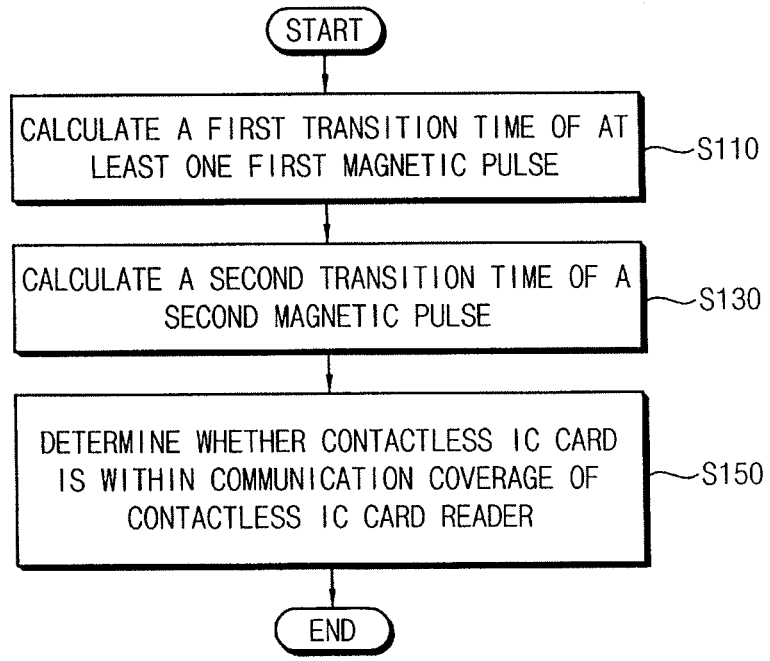
FIG. 2 illustrates an embodiment of a method for a contactless card reader.

FIG. 2 illustrates an embodiment of a method of operating the contactless IC card reader 100 in FIG. 1. Referring to FIGS. 1 and 2, in a calibration phase, the contactless IC card reader 100 calculates a first transition time, during a first transition interval, from a first regular level to a reference level of at least one first magnetic pulse (S110). The calibration phase may correspond to an interval in which it is certain that the contactless IC card 500 is out of communication coverage of the contactless IC card reader 100.

In a detection phase, the contactless IC card reader 100 calculates a second transition time, during a second transition interval, from a second regular level to the reference level of a second magnetic pulse (S130). The detection phase may correspond to an interval during which it is not certain that the contactless IC card 500 is out of communication coverage of the contactless IC card reader 100. An amplitude of the second magnetic pulse may vary according to whether the contactless IC card 500 is within communication coverage of the contactless IC card reader 100. The contactless IC card reader 100 determines whether the contactless IC card 500 is within communication coverage of the contactless IC card reader 100 based on comparison of the first and second transition times (S150).

FIG. 3 illustrates an example of operation for calculating the first transition time in FIG. 2. Referring to FIG. 3, a counting operation of a counter is triggered at a first staring point where the first transition interval begins (S111). For triggering the counting operation of the counter, the contactless IC card reader 100 may use a level detector to detect transition of the first magnetic pulse to trigger counting operation of the counter. In one embodiment, a first counting value is latched as a first digital code at a first ending point, where the first transition interval reaches the reference level (S113). To latch the first counting value as the first digital code, the contactless IC card reader 100 may use, for example, a comparator to compare a level of the first magnetic pulse with the reference level. The contactless IC card reader may latch the first counting value as the first digital code at a transitioning point of comparison signal output from the comparator. The first digital code may be stored in a register unit (S115).

FIG. 4 illustrates an example of an operation for calculating the second transition time in FIG. 2. Referring to FIG. 4, a counting operation of the counter is triggered at a second staring point, where the second transition interval begins (S131). To perform the triggering counting operation of the counter, the contactless IC card reader 100 may use, for example, the level detector to detect transition of the second magnetic pulse, to trigger counting operation of the counter. A second counting value is latched as a second digital code at a second ending point, where the second transition interval reaches the reference level (S133). To latch the second counting value as the second digital code, the contactless IC card reader 100 may use the comparator to compare a level of the second magnetic pulse with the reference level. The card reader may then latch the second counting value as the second digital code, at a transitioning point of comparison signal output from the comparator.

Figure 5:
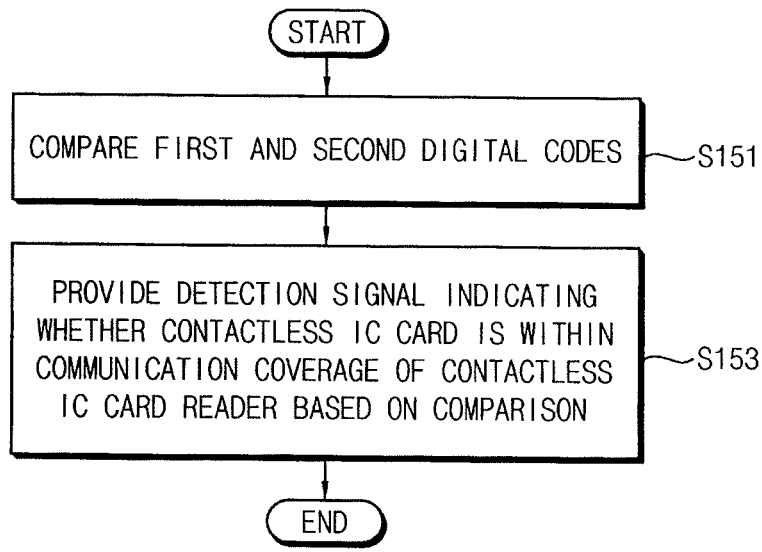
FIG. 5 illustrates an operation of determining whether a contactless IC card is within the communication coverage of a contactless IC card.

FIG. 5 illustrates an example of an operation for determining whether the contactless IC card is within communication coverage (or range) of the contactless IC card reader in FIG. 2.

Referring to FIG. 5, for determining whether the contactless IC card 500 is within the communication coverage of the contactless IC card reader 100, the contactless IC card reader 100 may use a digital comparator to compare the first digital code and the second digital code (S151). A detection signal may be provided to a central processing unit (CPU) of the contactless IC card reader 100 based on the comparison. The detection signal may indicate whether the contactless IC card 500 is within the communication coverage of the contactless IC card reader 100 (S153).

For example, when the second digital code is not less than the first digital code based on the comparison result, the contactless IC card 500 may determine that card 500 is out of communication coverage of the contactless IC card reader 100. Thus, the contactless IC card reader 100 may provide the CPU with a detection signal having a first logic level (a logic low level). The CPU may maintain the operation mode of the contactless IC card reader 100 in standby mode in response to the detection signal having a first logic level.

When the second digital code is smaller than the first digital code based on the comparison result, the contactless IC card 500 may be determined to be within the communication coverage of the contactless IC card reader 100. Thus, the contactless IC card reader 100 may provide the CPU with the detection signal having a second logic level (a logic high level). The CPU changes the operation mode of the contactless IC card reader 100 to an active mode in response to the detection signal having a second logic level, and initiates communication with the contactless IC card 500. The first and second digital codes may correspond to a number of counting pulses of the counter during the first and second transition times, respectively. The period of the counting pulses may be adjustable by the CPU.

Figure 6:
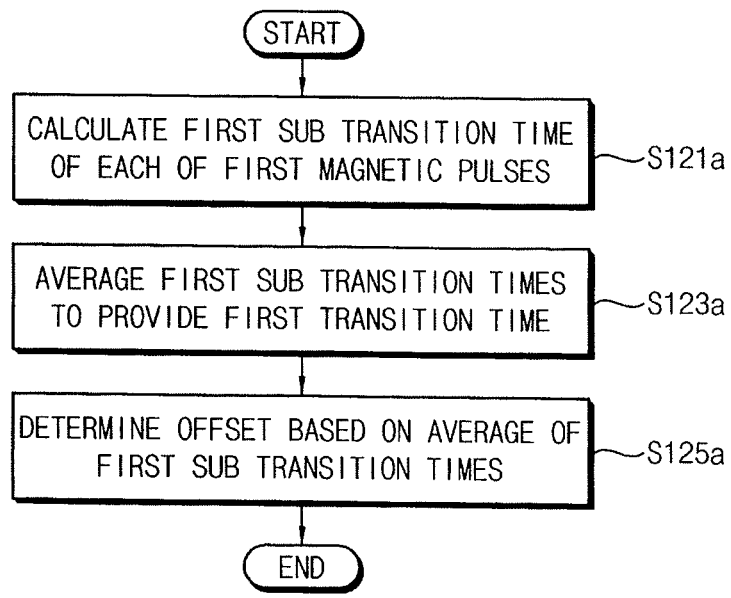
FIG. 6 illustrates an operation of calculating the first transition time in FIG. 2.

FIG. 6 illustrates an example of an operation for calculating the first transition time in FIG. 2. In FIG. 6, it is assumed that the at least one first magnetic pulse includes a plurality of first magnetic pulses.

Referring to FIG. 6, for calculating the first transition time, the contactless IC card reader 100 calculates a first sub transition time from the first regular level to the reference level of each of the plurality of first magnetic pulses (S121a). The contactless IC card reader 100 averages the first sub transition times to provide an average value as the first transition time (S123a). The contactless IC card reader 100 determines an offset corresponding to error range of the first sub transition times based on the average value of the first sub transition times (S125a). The contactless IC card reader 100 may determine whether the contactless IC card 500 is within communication coverage of the contactless IC card reader 100 by determining whether the second digital code in within a range of the offset of the first digital code, when the contactless IC card reader 100 uses the plurality of the first magnetic pulses.

Figure 7:
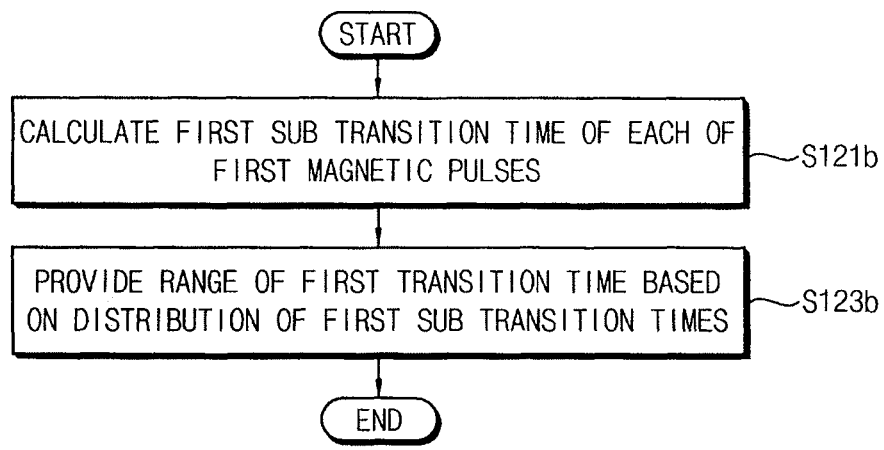
FIG. 7 illustrates another operation for calculating the first transition time in FIG. 2.

FIG. 7 illustrates an example of an operation for calculating the first transition time in FIG. 2. In FIG. 7, it is assumed that the at least one first magnetic pulse includes a plurality of first magnetic pulses as in FIG. 6.

Referring to FIG. 7, to calculate the first transition time, the contactless IC card reader 100 calculates a first sub transition time from the first regular level to the reference level of each of the plurality of first magnetic pulses (S121b). The contactless IC card reader 100 provides a range of the first transition time based on distributions of the first sub transition times (S123b).

Figure 8:
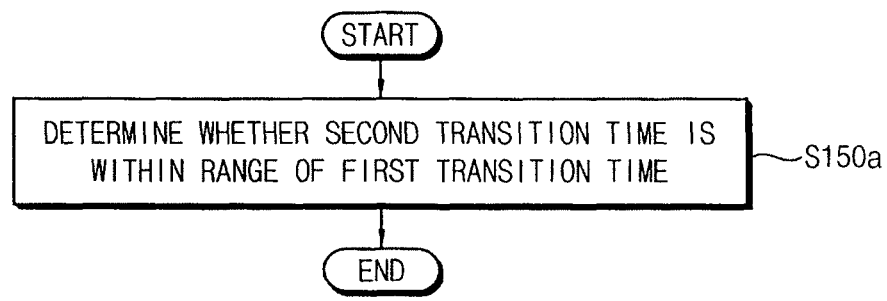
FIG. 8 illustrates another operation of determining whether the contactless IC card is within a communication coverage of a contactless IC card reader.

FIG. 8 illustrates an example of an operation for determining whether the contactless IC card is within the communication coverage of the contactless IC card reader in FIG. 2. In FIG. 8, it is assumed that the step (S110) includes the steps (S121b and S123b).

Referring to FIGS. 7 and 8, the contactless IC card reader 100 may determine whether the second transition time is within the range of the first transition time (S150a) after calculating the first sub-transition time from the first regular level to the reference level of each of the plurality of first magnetic pulse. The card reader 100 may then provide the range of the first transition time based on distributions of the first sub-transition times. That is, the contactless IC card reader 100 calculates the distributions of the first sub-transition times using a plurality of first magnetic pulses, and initiates communication with the contactless IC card 500 when it is determined that the second transition time is within the distributions of the first sub transition times (range of the first transition time).

FIG. 9 illustrates an embodiment of a method of operating the contactless IC card reader 100 in FIG. 1. In FIG. 9, the contactless IC card reader 100 determines whether the contactless IC card 500 is within the communication coverage by measuring falling transition times of the first and second magnetic pulses.

Referring to FIGS. 1 and 9, in the calibration phase, the contactless IC card reader 100 converts a level of at least one first original magnetic pulse (S101a). The contactless IC card reader 100 low-pass filters the level-converted first original magnetic pulse to provide the first magnetic pulse, in the calibration phase (S103a). The contactless IC card reader 100 calculates a first transition time during a first transition interval, from a first regular level to a reference level of the first magnetic pulse in the calibration phase (S110a). The calibration phase may correspond to an interval during which it is certain that the contactless IC card 500 is out of communication coverage of the contactless IC card reader 100.

The contactless IC card reader 100 converts a level of a second original magnetic pulse in the detection phase (S125a). The contactless IC card reader 100 low-pass filters the level-converted second original magnetic pulse to provide the second magnetic pulse in the detection phase (S127a). The contactless IC card reader 100 calculates a second transition time during a second transition interval, from a second regular level to the reference level of the second magnetic pulse, in the detection phase (S130). The detection phase may correspond to an interval during which it is not certain that the contactless IC card 500 is out of communication coverage of the contactless IC card reader 100. An amplitude of the second magnetic pulse may be varied according to whether the contactless IC card 500 is within communication coverage of the contactless IC card reader 100.

The contactless IC card reader 100 determines whether the contactless IC card 500 is within communication coverage of the contactless IC card reader 100 based on comparison of the first and second transition times (S150). That is, the at least one first magnetic pulse may be generated from the at least one first original magnetic pulse in the calibration phase, and the second magnetic pulse may be generated from the on at least one second original magnetic pulse in the detection phase. Since the contactless IC card reader 100 determines whether the contactless IC card 500 is within the communication coverage by measuring falling transition times of the first and second magnetic pulses, the first regular level may correspond to a peak level of the first magnetic pulse, and the second regular level may correspond to a peak level of the second magnetic pulse.

FIG. 10 illustrates another embodiment of a method for operating a contactless IC card reader, such as shown, for example, in FIG. 1. In FIG. 10, the contactless IC card reader 100 determines whether the contactless IC card 500 is within the communication coverage (or range) by measuring rising transition times of the first and second magnetic pulses.

More specifically, referring to FIGS. 1 and 10, the contactless IC card reader 100 converts a level of at least one first original magnetic pulse in the calibration phase (S101b). The contactless IC card reader 100 high-pass filters the level-converted first original magnetic pulse to provide the first magnetic pulse in the calibration phase (S103b). The contactless IC card reader 100 calculates a first transition time (rising transition time) during a first transition interval, from a first regular level to a reference level of the first magnetic pulse, in the calibration phase (S110a). The calibration phase may correspond to an interval during which it is certain that the contactless IC card 500 is out of communication coverage of the contactless IC card reader 100.

The contactless IC card reader 100 converts a level of a second original magnetic pulse in the detection phase (S125b). The contactless IC card reader 100 high-pass filters the level-converted second original magnetic pulse to provide the second magnetic pulse in the detection phase (S127b). The contactless IC card reader 100 calculates a second transition time (rising transition time) during a second transition interval, from a second regular level to the reference level of the second magnetic pulse, in the detection phase (S130). The detection phase may correspond to an interval during which it is not certain that the contactless IC card 500 is out of communication coverage of the contactless IC card reader 100. An amplitude of the second magnetic pulse may vary according to whether the contactless IC card 500 is within communication coverage (or range) of the contactless IC card reader 100.

Also, the contactless IC card reader 100 may determine whether the contactless IC card 500 is within communication coverage of the contactless IC card reader 100 based on a comparison of the first and second transition times (S150). For example, the at least one first magnetic pulse may be generated from the at least one first original magnetic pulse in the calibration phase. The second magnetic pulse may be generated from the on at least one second original magnetic pulse in the detection phase. Since the contactless IC card reader 100 determines whether the contactless IC card 500 is within the communication coverage by measuring rising transition times of the first and second magnetic pulses, the first regular level may correspond to a bottom level of the first magnetic pulse, and the second regular level may correspond to a bottom level of the second magnetic pulse.

More specifically, the contactless IC card 500 may be determined to be within communication coverage of the contactless IC card reader 100 based on a comparison, performed by the contactless IC card reader 100, between the reference level with a rising transition time or a falling transition time of a short magnetic pulse in a calibration phase and a detection phase of a standby mode. The contactless IC card reader 100 may maintain the operation mode of the contactless IC card reader 100 in standby mode, or change the operation mode to active mode, based on the comparison.

This method, therefore, when compared with other proposed methods which compare magnetic pulses in the calibration phase and the detection phase, the contactless IC card reader 100 is not required to include an analog-to-digital converter and logic circuits. The structure of the contactless IC card reader 100 may therefore be simply implemented, and an occupied area may be reduced and power consumption may be greatly reduced.

Figure 11A:
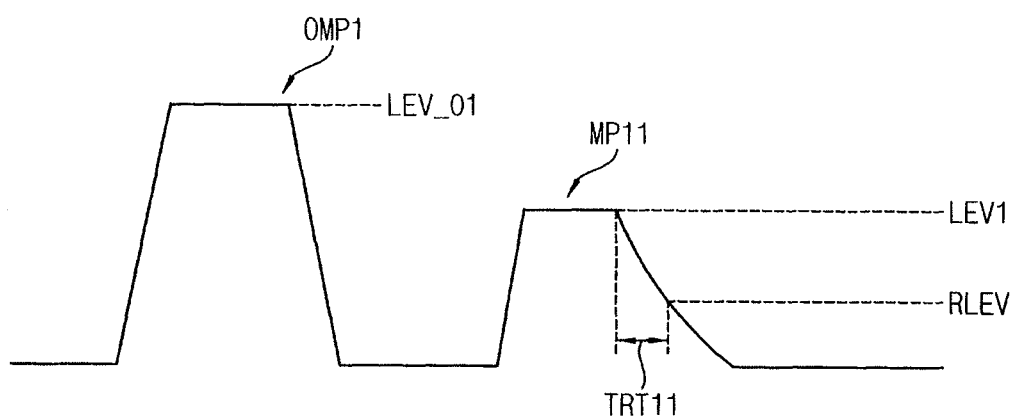
FIG. 11A illustrates an example of a first original magnetic pulse and a first magnetic pulse.
Figure 11B:
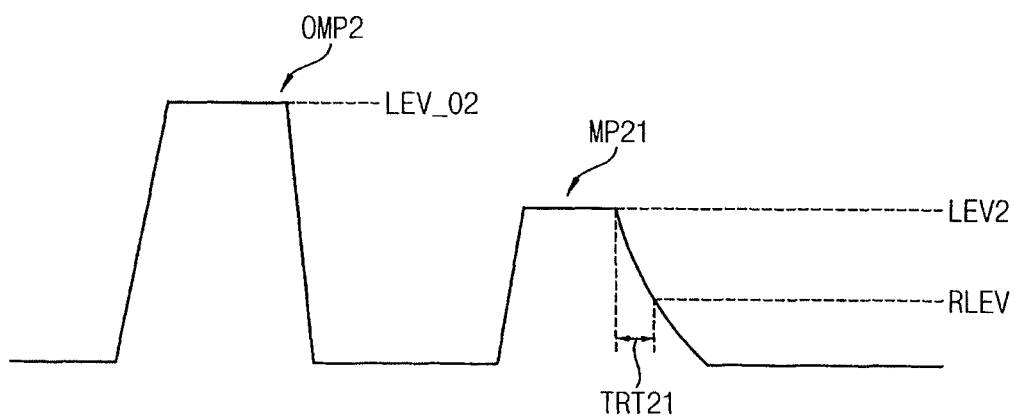
FIG. 11B illustrates an example of a second original magnetic pulse and a second magnetic pulse.

FIG. 11A illustrates an example of the first original magnetic pulse and the first magnetic pulse, and FIG. 11B illustrates an example of the second original magnetic pulse and the second magnetic pulse.

Referring to FIG. 11A, a first original magnetic pulse OMP1 may have a first regular level LEV_01 as a peak level. A first magnetic pulse MP11 may be generated from the first original magnetic pulse OMP1 and may have a first regular level LEV1 as a peak level. A transition time from the first regular level LEV1 to a regular level RLEV may correspond to a first transition time TRT11, during a first transition interval of the first magnetic pulse MP11. The first magnetic pulse MP11 may be generated from the first original magnetic pulse OMP1, for example, through operations S101a and S103a in FIG. 9.

Referring to FIG. 11B, a second original magnetic pulse OMP2 may have a second regular level LEV_02 as a peak level. A second magnetic pulse MP21 may be generated from the second original magnetic pulse OMP2 and may have a second regular level LEV2 as a peak level. A transition time from the second regular level LEV2 to the regular level RLEV may correspond to a second transition time TRT21, during a second transition interval of the second magnetic pulse MP21. The second magnetic pulse MP21 may be generated from the second original magnetic pulse OMP2 through, for example, operations S125a and S127a in FIG. 9.

Figure 12A:
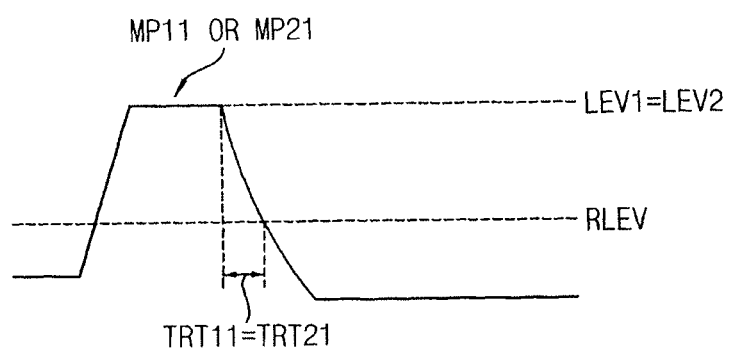
FIG. 12A illustrates an example of the first and second magnetic pulses in a detection phase.
Figure 12B:
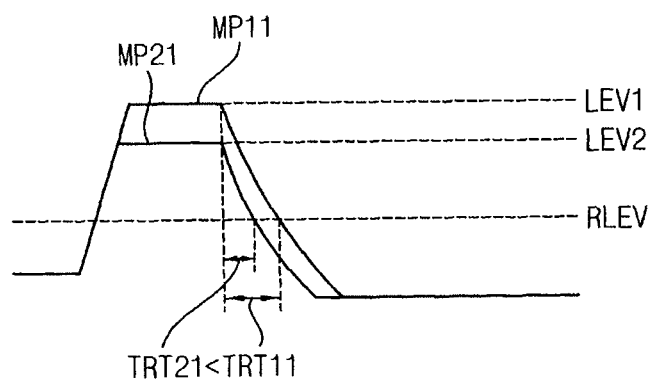
FIG. 12B illustrates an example of the first and second magnetic pulses in a detection phase.

FIG. 12A illustrates an example of the first and second magnetic pulses in the detection phase, and FIG. 12B illustrates an example of the first and second magnetic pulses in the detection phase. More specifically, FIG. 12A illustrates the first and second magnetic pulses MP11 and MP21 when the contactless IC card 500 is out of communication coverage (or range) of the contactless IC card reader 100. FIG. 12B illustrates the first and second magnetic pulses MP11 and MP21 when the contactless IC card 500 is within communication coverage of the contactless IC card reader 100.

Referring to FIG. 12A, when contactless IC card 500 is out of communication coverage of the contactless IC card reader 100, a first level LEV1 of the first magnetic pulse MP11 is substantially same as a second level LEV2 of the second magnetic pulse MP21. This is because the second magnetic pulse MP21 is not mutually coupled to the antenna 502 of the contactless IC card 500. Therefore, the first transition time TRT11 is substantially same as the second transition time TRT21. The contactless IC card 500 is determined to be out of communication coverage of the contactless IC card reader 100 under these circumstances.

Referring to FIG. 12B, when contactless IC card 500 is within communication coverage of the contactless IC card reader 100, a first level LEV1 of the first magnetic pulse MP11 is reduced in comparison to a second level LEV2 of the second magnetic pulse MP21. This is because the second magnetic pulse MP21 is mutually coupled to the antenna 502 of the contactless IC card 500. Therefore, the first transition time TRT11 is greater than the second transition time TRT21. The contactless IC card 500 is determined to be within communication coverage of the contactless IC card reader 100 under these circumstances. In this case, the contactless IC card reader 100 changes the operation mode from standby mode to active mode and initiates communication with the contactless IC card 500.

FIGS. 11A through 12B illustrates that the contactless IC card reader 100 determines whether the contactless IC card 500 is within the communication coverage of the contactless IC card reader 100 using the falling transition times of the first and second magnetic pulses MP11 and MP21. The communication coverage of the contactless IC card reader 100 may be determined in a different manner in other embodiments, as discussed below.

Figure 13A:
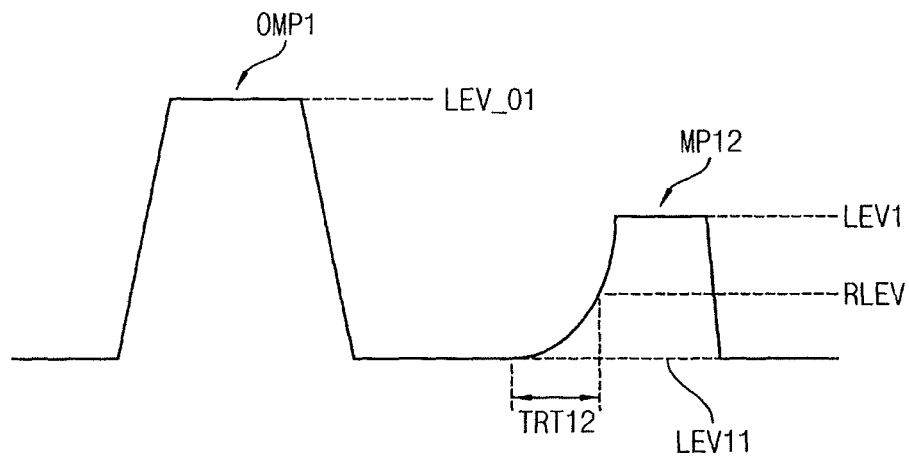
FIG. 13A illustrates an example of the first original magnetic pulse and the first magnetic pulse.
Figure 13B:
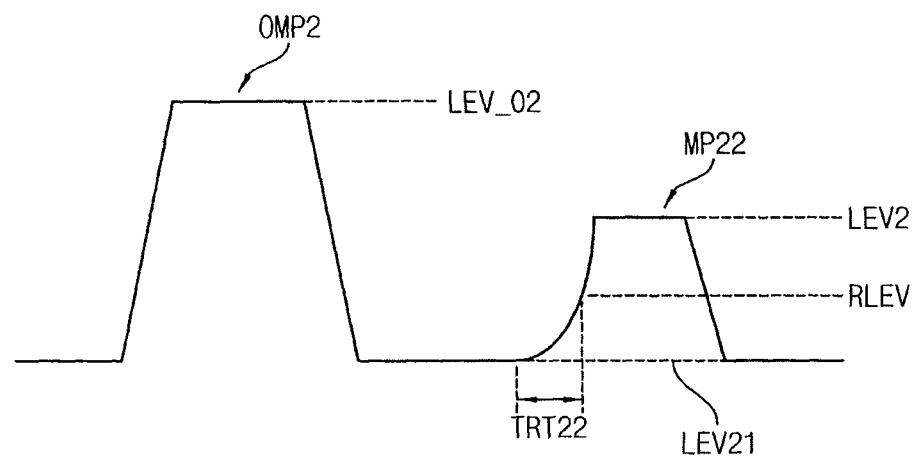
FIG. 13B illustrates an example of the second original magnetic pulse and the second magnetic pulse.

FIG. 13A illustrates an example of the first original magnetic pulse and the first magnetic pulse, and FIG. 13B illustrates an example of the second original magnetic pulse and the second magnetic pulse.

Referring to FIG. 13A, a first original magnetic pulse OMP1 may have the first regular level LEV_01 as a peak level. A first magnetic pulse MP12 may be generated from the first original magnetic pulse OMP1 and may have a level LEV1 as a peak level and have a first regular level LEV11 as a bottom level. A transition time from the bottom level LEV11 to the first regular level RLEV may correspond to a first transition time TRT12, during a first transition interval of the first magnetic pulse MP12. The first magnetic pulse MP12 may be generated from the first original magnetic pulse OMP1, for example, through operations S101b and S103b in FIG. 10.

Referring to FIG. 13B, a second original magnetic pulse OMP2 may have a second regular level LEV_02 as a peak level. A second magnetic pulse MP22 generated from the second original magnetic pulse OMP2 and may have a level LEV2 as a peak level and have a second regular level LEV21 as a bottom level. A transition time from the bottom level LEV21 to the regular level RLEV may correspond to a second transition time TRT22, during a second transition interval of the second magnetic pulse MP22. The second magnetic pulse MP22 may be generated from the second original magnetic pulse OMP2, for example, through operations S125b and S127b in FIG. 10.

Figure 14A:
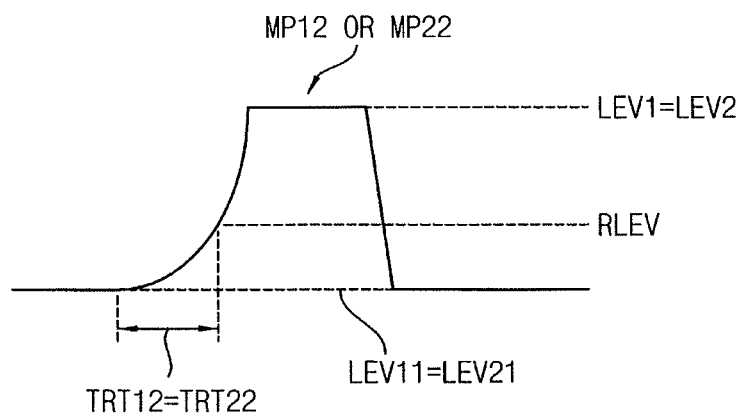
FIG. 14A illustrates an example of the first and second magnetic pulses in the detection phase.
Figure 14B:
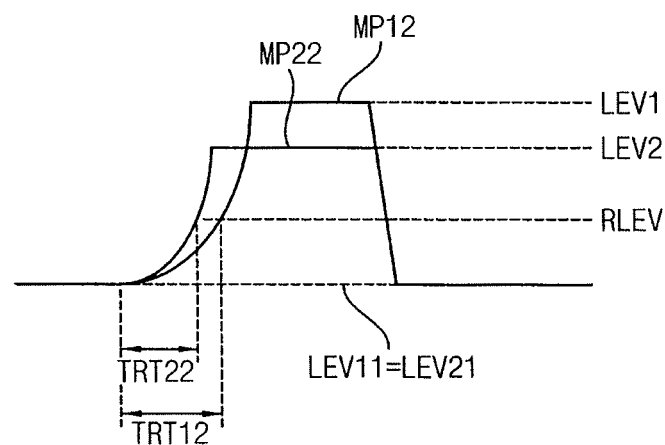
FIG. 14B illustrates an example of the first and second magnetic pulses in the detection phase.

FIG. 14A illustrates an example of the first and second magnetic pulses in the detection phase, and FIG. 14B illustrates an example of the first and second magnetic pulses in the detection phase. More specifically, FIG. 14A illustrates the first and second magnetic pulses MP12 and MP22 when the contactless IC card 500 is out of communication coverage (or range) of the contactless IC card reader 100. FIG. 14B illustrates the first and second magnetic pulses MP12 and MP22 when the contactless IC card 500 is within communication coverage of the contactless IC card reader 100.

Referring to FIG. 14A, when contactless IC card 500 is out of communication coverage of the contactless IC card reader 100, a peak level LEV1 of the first magnetic pulse MP12 is substantially same as a peak level LEV2 of the second magnetic pulse MP22. This is because the second magnetic pulse MP21 is not mutually coupled to the antenna 502 of the contactless IC card 500. Therefore, the first transition time TRT12 is substantially same as the second transition time TRT22. The contactless IC card 500 is determined to be out of communication coverage of the contactless IC card reader 100 under these circumstances.

Referring to FIG. 14B, when contactless IC card 500 is within communication coverage of the contactless IC card reader 100, a peak level LEV1 of the first magnetic pulse MP12 is reduced and is different from a peak level LEV2 of the second magnetic pulse MP22. This is because the second magnetic pulse MP22 is mutually coupled to the antenna 502 of the contactless IC card 500. Therefore, the first transition time TRT12 is greater than the second transition time TRT22. The contactless IC card 500 is determined to be within communication coverage of the contactless IC card reader 100 under these circumstances. In this case, the contactless IC card reader 100 changes the operation mode from standby mode to active mode and initiates communication with the contactless IC card 500.

The embodiments of FIGS. 13A through 14B determine whether the contactless IC card 500 is within communication coverage of the contactless IC card reader 100 using the rising transition times of the first and second magnetic pulses MP12 and MP22. Other embodiments may make this determination in a different manner.

Figure 15:
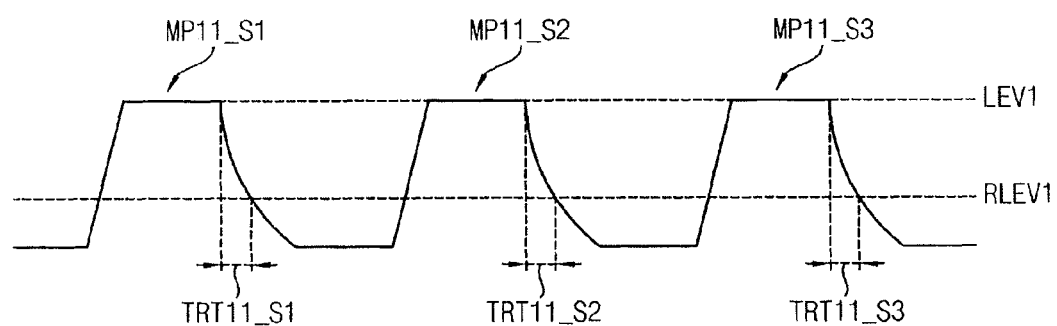
FIG. 15 illustrates one way in which the contactless IC card reader calculates the first transition time using a plurality of first magnetic pulses.

FIG. 15 illustrates an embodiment in which the contactless IC card reader calculates the first transition time using a plurality of first magnetic pulses. Referring to FIG. 15, the contactless IC card reader 100 calculates first sub-transition times TRT11_S1, TRT11_S2 and TRT11_S3 of a respective plurality of first magnetic pulses MP11_S1, MP11_S2 and MP11_S3 which are periodically transmitted during first transition intervals. The contactless IC card reader determines whether the contactless IC card 500 is within the communication range of the contactless IC card reader 100 based on the first sub transition times TRT11_S1, TRT11_S2 and TRT11_S3.

In addition, the contactless IC card reader 100 then averages the first sub-transition times TRT11_S1, TRT11_S2 and TRT11_S3 and calculates average value and an offset based on the average value. The contactless IC card reader 100 determines that the contactless IC card is within the range of the contactless IC card reader 100 when the second transition time is in an offset range with respect to the average value. The contactless IC card reader 100 may use the average value of the first sub-transition times TRT11_S1, TRT11_S2 and TRT11_S3 through the operations in FIG. 6.

In addition, the contactless IC card reader 100 may calculate distribution of the first sub-transition times TRT11_S1, TRT11_S2 and TRT11_S3. The contactless IC card reader 100 determines the contactless IC card is within the range of the contactless IC card reader 100 when the second transition time is within a range of the distribution of the first sub-transition times TRT11_S1, TRT11_S2 and TRT11_S3. The contactless IC card reader 100 may use the distribution of the first sub-transition times TRT11_S1, TRT11_S2 and TRT11_S3 through the operations in FIGS. 7 and 8.

Figure 16:
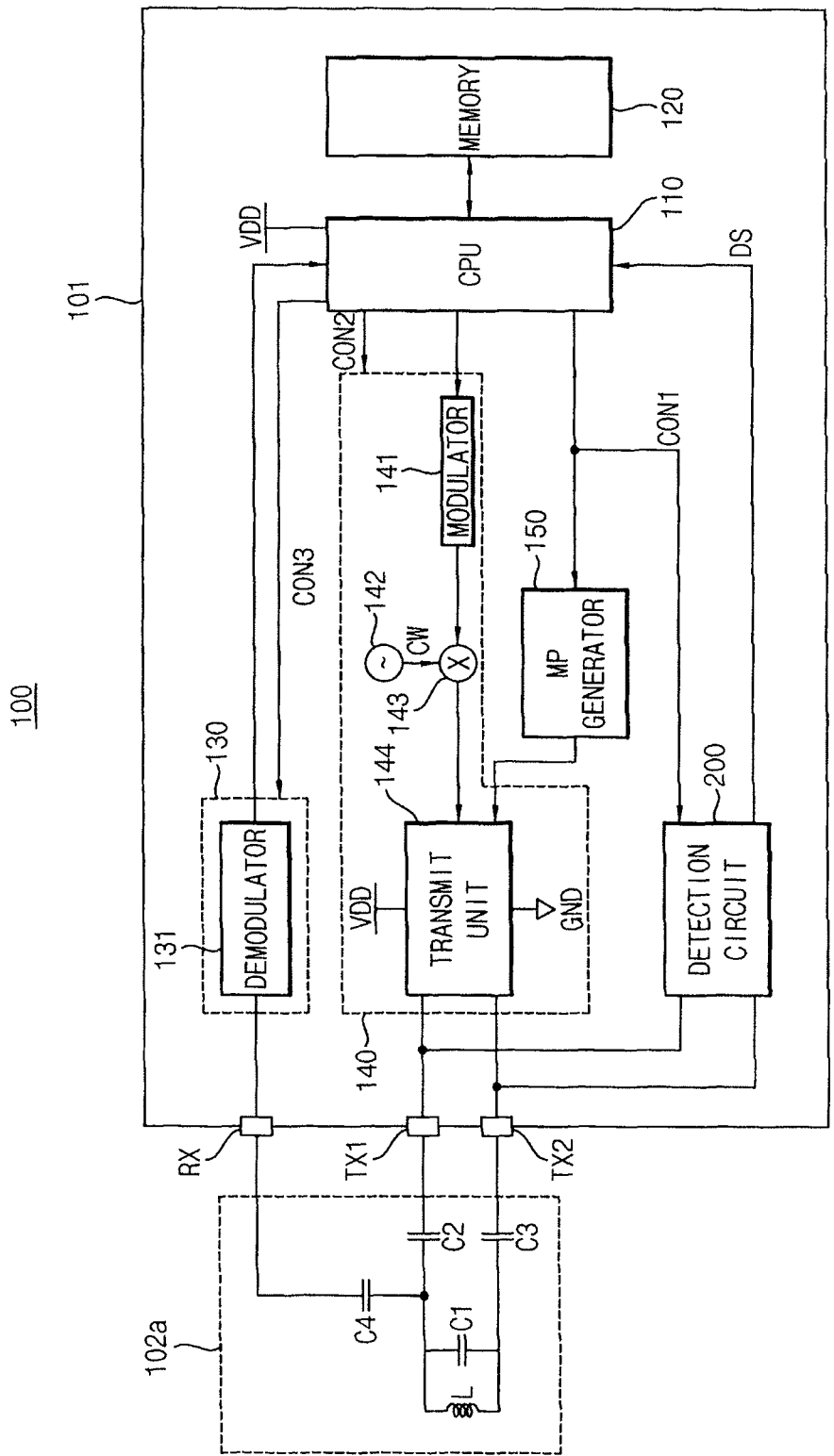
FIG. 16 illustrates a block diagram illustrating an example of the contactless IC card reader in FIG. 1 according to some exemplary embodiments.

FIG. 16 illustrates an embodiment of the contactless IC card reader 100 in FIG. 1 which includes a contactless IC card reader chip 101 and a resonance unit 102a. The contactless IC card reader chip 101 is connected to the resonance unit 102a through first and second transmission terminals TX1 and TX2 and a reception terminal RX.

The resonance unit 102a may include a resonance circuit having an antenna L and a first capacitor C1, a first filter including a fourth capacitor C4 through which the resonance circuit is connected to the reception terminal RX, and a matching unit including a second filter including a second capacitor and a third capacitor C3 which the resonance circuit is connected to the first and second transmission terminals TX1 and TX2 through and perform an impedance matching.

The contactless IC card reader chip 101 may perform a transmission operation through the first and second transmission terminals and may perform reception operation through the reception terminal RX.

The contactless IC card reader chip 101 may include a CPU (or a processor 110), a memory 120, a reception block 130 including a demodulator 131, a transmission block 140 including a modulator 141, an oscillator 142, a mixer 143, a transmit unit 144, a magnetic pulse generator 150, and a detection circuit 200. The CPU 110 may control overall operations of the contactless IC card reader chip 101. The CPU 110 may be operated by receiving a power source voltage VDD from a power source unit such as a battery.

When a transmission operation is performed in an active mode, the CPU 110 may read out output data from the memory 120 to the modulator 141. The modulator 141 may modulate the output data to generate a modulated signal. In addition, the oscillator 142 may generate a carrier signal CW having a frequency corresponding to a carrier frequency (for example, 13.56 MHz), The mixer 143 may combine the carrier signal CW with the modulated signal to generate a transmission signal.

The transmit unit 144 may provide the transmission signal to the resonance unit 102a through the first and second transmission terminals TX1 and TX2. The resonance unit 102a may radiate electromagnetic waves which correspond to the transmission signal. For example, the transmission unit 144 may be connected between the power source voltage VDD and the ground voltage GND. The transmit unit 144 may allow the first and second transmit terminals TX1 and TX2 to be connected to either the power source voltage VDD through a pull-up load or the ground voltage GND through pull-down load based on the transmission signal. When connected in this manner, the transmission signal may be provided to the resonance unit 102a through the first and second transmit terminals TX1 and TX2.

When a reception operation is performed in active mode, the demodulator 131 may demodulate a signal, provided through the reception terminal RX from the resonance unit 102a, to generate input data and may provide the input data to the CPU 110. The CPU 110 may store the input data in the memory 120.

In the calibration phase of the standby mode, the magnetic pulse generator 150 may generate the first original magnetic pulse OMP1 to be transmitted through the transmit unit 144 and the resonance unit 102a in response to a first control signal CON1 from the CPU 110. The detection circuit 200 may calculate the first transition time of the first magnetic pulse MP11 or MP12 based on the first original magnetic pulse OMP1 transmitted through the resonance unit 102a during the first transition interval. The calculated first transition time may be stored as a first digital code.

In the detection phase of the standby mode, the magnetic pulse generator 150 may generate the second original magnetic pulse OMP2 for determining whether the contactless IC card 500 is within communication coverage. The second original magnetic pulse OMP2 may be transmitted through the transmit unit 144 and the resonance unit 102a in response to the first control signal CON1 from the CPU 110. The detection circuit 200 may calculate the second transition time of the second magnetic pulse MP21 or MP22 based on the second original magnetic pulse OMP2 transmitted through the resonance unit 102a during the second transition interval, may compare the first digital code with the second digital code corresponding to the second transition time, and may determine whether the contactless IC card 500 is within communication coverage.

The detection circuit 200 may determine whether the contactless IC card 500 is within the communication coverage, and may generate and provide a detection signal DS to the CPU 110 indicating whether contactless IC card 500 is within communication coverage. The CPU 110 may receive the detection signal DS and may determine the operation mode of the contactless IC card reader 100 according to a logic level of the detection circuit 200.

For example, when the contactless IC card 500 is out of communication coverage of the contactless IC card reader 100 and the detection signal DS is logic low level, the CPU 110 may maintain the operation mode of the contactless IC card reader 100 as standby mode. When the contactless IC card 500 is within communication coverage of the contactless IC card reader 100 and the detection signal DS is logic low level, the CPU 110 may change the operation mode of the contactless IC card reader 100 to the active mode.

In active mode, the CPU 110 provides a second control signal CON2 to enable the transmission block 140 and transmits a request command through the transmission block 140. The CPU 110 provides a third control signal CON3 to enable the reception block 130 and the reception block 130 may await a response in response to the request command from the contactless IC card 500 during a predetermined time interval. When the response is received in response to the request command during the predetermined time interval, the contactless IC card reader 100 initiates data transmission/reception with the contactless IC card 500.

When the response is not received in response to the request command during the predetermined time interval, the CPU 110 provides the second and third control signals CON2 and CON3 to disable the transmission block 140 and the reception block 130 respectively. Also, the CPU 110 provides the first control signal CON1 to the detection signal to perform above-described detection operation. Although the CPU 110 disables the transmission block 140 by the second control signal CON2, the transmit unit 144 is enabled to transmit the magnetic pulse through the resonance unit 102a.

The first through third control signals CON1~CON3 may include two or more bits. For example, in standby mode, some bits of the second control signal CON2 may be used for disabling the modulator 141, the oscillator 142, and the mixer 143. Other bits of the second control signal CON2 may be used for enabling the transmit unit 144 to transmit the magnetic pulse. In addition, some bits of the first control signal CON1 may be used for adjusting the period of the clock pulses in the detection circuit 200 or for resetting the counter. Other bits of the first control signal CON1 may be used for adjusting the reference level RLEV of a reference voltage generator in the detection circuit 200.

Figure 17:
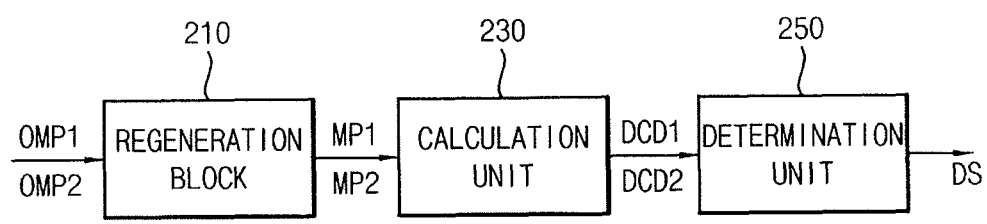
FIG. 17 illustrates an example of the detection circuit in FIG. 16.

FIG. 17 illustrates an example of the detection circuit in FIG. 16 according to some exemplary embodiments. Referring to FIG. 17, the detection circuit 200 includes a regeneration block 210, a first calculation unit 230, and a determination unit 250.

The regeneration block 210 may generate the first original magnetic pulse OMP1 transmitted through the resonance unit 102a to provide the first magnetic pulse MP1 in the calibration phase of the standby mode. The regeneration block 210 may regenerate the second original magnetic pulse OMP2 transmitted through the resonance unit 102a to provide the second magnetic pulse MP2 in the detection phase of the standby mode. The first calculation unit 230 receives the first magnetic pulse MP1, calculates the first transition time TRT11 or TRT12 of the first magnetic pulse MP1 using the counter, latches the first digital code DCD1 corresponding to the first transition time TRT11 or TRT12, and provides the first digital code DCD1 to the determination unit 250 in the calibration phase of the standby mode.

In addition, the first calculation unit 230 receives the second magnetic pulse MP2, calculates the second transition time TRT21 or TRT22 of the second magnetic pulse MP2 using the counter, latches the second digital code DCD2 corresponding to the second transition time TRT21 or TRT22, and provides the second digital code DCD2 to the determination unit 250 in the detection phase of the standby mode.

The determination unit 250 stores the first digital code DCD1 in the calibration phase, compares the first digital code DCD1 and the second digital code DCD2, and provides the detection signal DS according to the comparison result in the detection phase. For example, when the second digital code DCD2 is not less than the first digital code DCD1, the contactless IC card 500 may be determined to be out of communication coverage of the contactless IC card reader 100. The determination unit 250 may therefore output the detection signal DS having a first logic level (a logic low level). When the second digital code DCD2 is smaller than the first digital code DCD1, the contactless IC card 500 may be determined to be within the communication coverage of the contactless IC card reader 100. The determination unit 250 may therefore output the detection signal DS having a second logic level (a logic high level).

Figure 18:
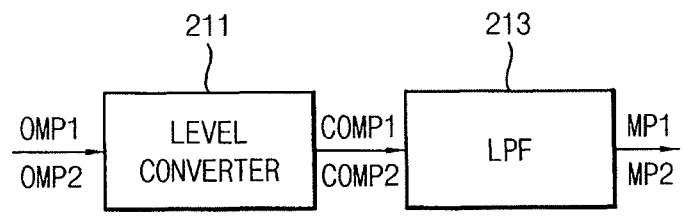
FIG. 18 illustrates an example of the regeneration block in FIG. 17.

FIG. 18 illustrates an example of the regeneration block in FIG. 17 according to some exemplary embodiments. FIG. 18 illustrates a case when the detection circuit 200 in FIG. 17 determines whether the contactless IC card 500 is within the communication coverage of the contactless IC card reader 100 using the falling transition time of the first magnetic pulse MP1, as illustrated in FIGS. 11A and 11B.

Referring to FIG. 18, a regeneration block 210a may include a level converter 211 and a low-pass filter 213. The level converter 211 converts (e.g., reduces) a level of the first original magnetic pulse OMP1 to output a level-converted first original magnetic pulse COMP1 in the calibration phase. The level converter 211 may also convert (e.g., reduce) a level of the second original magnetic pulse OMP2 to output a level-converted second original magnetic pulse COMP2 in the detection phase.

The low-pass filter 213 low-pass filters the level-converted first original magnetic pulse COMP1 to output the first magnetic pulse MP1 in the calibration phase and low-pass filters the level-converted second original magnetic pulse COMP2 to output the second magnetic pulse MP2 in the detection phase. In one embodiment, the level converter 211 may convert antenna-level voltage to a level which the detection circuit 200 may perceive and operate. The low-pass filter 213 may strengthen the falling transition of the first and second magnetic pulses MP1 and MP2.

Figure 19:
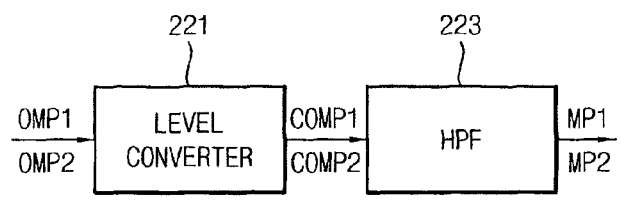
FIG. 19 illustrates another example of the regeneration block in FIG. 17.

FIG. 19 illustrates an example of the regeneration block in FIG. 17. More specifically, FIG. 19 illustrates a case when the detection circuit 200 in FIG. 17 determines whether the contactless IC card 500 is within communication coverage of the contactless IC card reader 100 using the rising transition time of the first magnetic pulse MP1 as illustrated in FIGS. 13A and 13B.

Referring to FIG. 19, a regeneration block 210b may include a level converter 221 and a high-pass filter 223. The level converter 221 converts (e.g., reduces) a level of the first original magnetic pulse OMP1 to output a level-converted first original magnetic pulse COMP1 in the calibration phase The level converter 221 may also convert (e.g., reduce) a level of the second original magnetic pulse OMP2 to output a level-converted second original magnetic pulse COMP2 in the detection phase.

The high-pass filter 223 filters the level-converted first original magnetic pulse COMP1 to output the first magnetic pulse MP1 in the calibration phase. The high-pass filter 223 also filters the level-converted second original magnetic pulse COMP2 to output the second magnetic pulse MP2 in the detection phase. The level converter 221 converts antenna-level voltage to a level which the detection circuit 200 may perceive and operate. The high-pass filter 223 may strengthen the rising transition of the first and second magnetic pulses MP1 and MP2.

Figure 20:
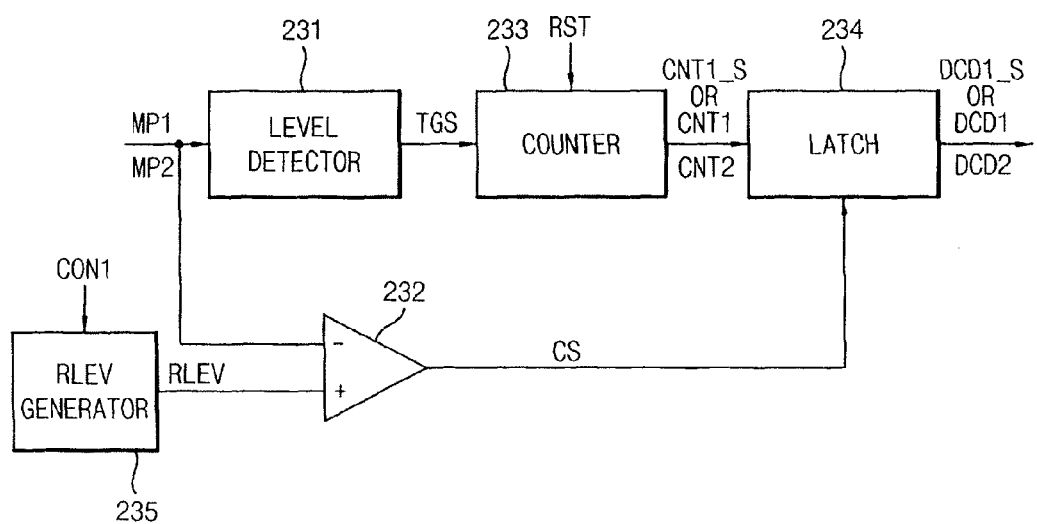
FIG. 20 illustrates an example of a first calculation unit in FIG. 17.

FIG. 20 illustrates an example of the first calculation unit 230 as shown in FIG. 17. Referring to FIG. 20, the first calculation unit 230 may include a level detector 231, a comparator 232, a counter 233, a latch 234, and a reference voltage generator 235.

The level detector 231 activates a trigger signal TGS to the counter 233 when the first magnetic pulse MP1 begins to rise or fall from the first regular level in the calibration phase. The level detector 231 activates the trigger signal TGS to the counter 233 when the second magnetic pulse MP2 begins to rise or fall from the second regular level in the detection phase. The CPU may be reset in response to a reset signal RST from the CPU 110. The counter 233 performs counting-up operation in response to the trigger signal TRG.

The comparator 232 compares the first magnetic pulse MP1 with the reference level RLEV and outputs to the latch 234 a comparison signal CS, which transits at a timing when the first magnetic pulse MP1 reaches the reference level RLEV in the calibration phase. The comparator 232 also compares the second magnetic pulse MP2 with the reference level RLEV and outputs to the latch 234 the comparison signal CS, which transits at a timing when the second magnetic pulse MP2 reaches the reference level RLEV in the detection phase.

The latch 234 latches a first counting value CNT1 corresponding to the first transition time of the first magnetic pulse MP1 as the first digital code DCD1 in response to the comparison signal CS in the calibration phase. The latch 234 latches a second counting value CNT2 corresponding to the second transition time of the second magnetic pulse MP2 as the second digital code DCD2 in response to the comparison signal CS in the detection phase. The first counting value CNT1 may correspond to the number of the counting pulses of the counter 233 during the first transition time TRT11 in FIG. 11A. The second counting value CNT2 may correspond to the number of counting pulses of the counter 233 during the second transition time TRT21 in FIG. 11B.

The detection circuit 200 determines whether the contactless IC card 500 is within the communication range of the contactless IC card reader 100 using the plurality of first magnetic pulses MP11_S1, MP11_S2 and MP11_S3 as illustrated in FIG. 15. The counter 233 counts first sub-counting values CNT1_S of first sub-transition times TRT11_S1, TRT11_S2, and TRT11_S3 of the first magnetic pulses MP11_S1, MP11_S2 and MP11_S3, respectively. The latch (or digital latch) 234 may latch first sub-digital codes DCD1_S corresponding to the first sub-counting values CNT1_S, respectively, in the calibration phase.

The reference voltage generator 235 may generate and provide the reference voltage having the reference level RLEV to the comparator 232. The reference voltage generator 235 may adjust the reference level RLEV in response to the first control signal CON1.

Figure 21:
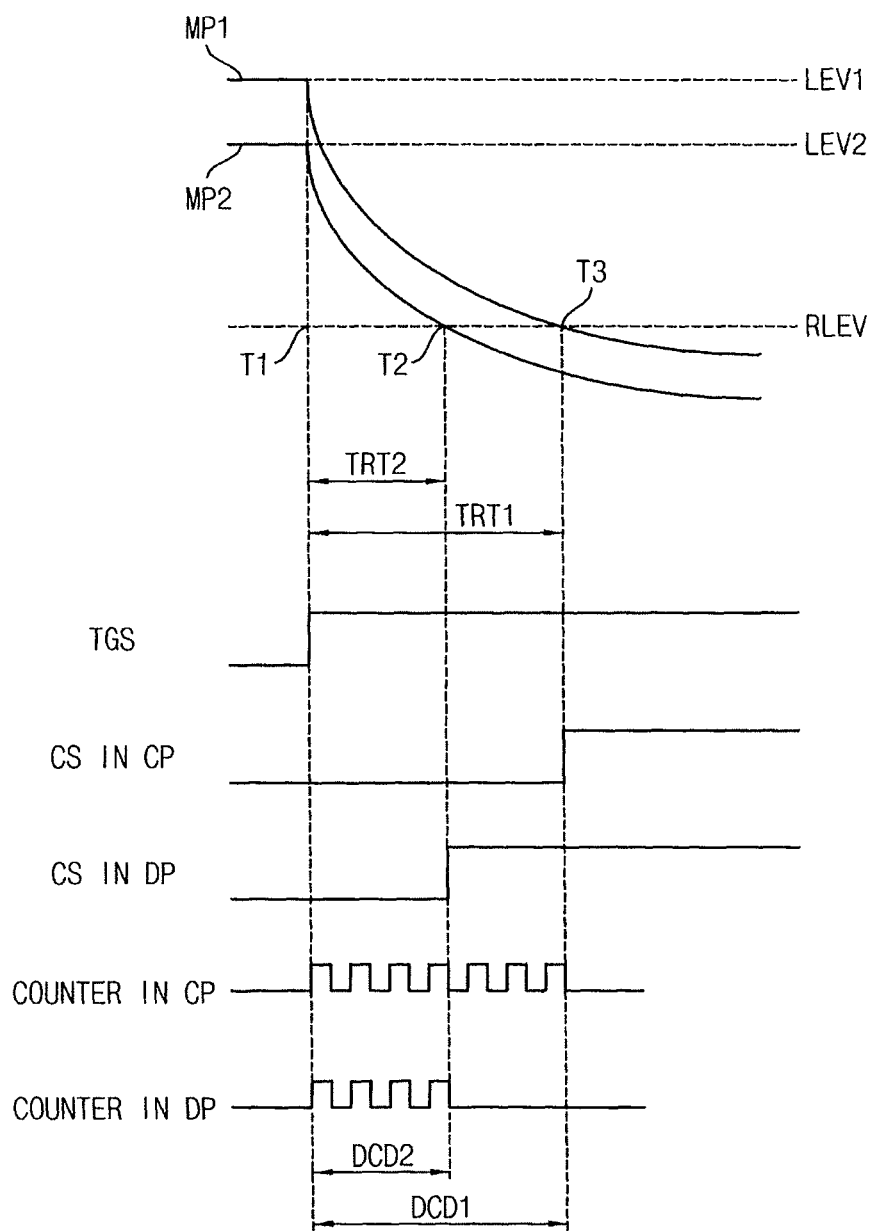
FIG. 21 is a timing diagram for the first calculation unit of FIG. 20.

FIG. 21 illustrates an example of a timing diagram corresponding to operation of the first calculation unit of FIG. 20. Referring to FIGS. 20 and 21, at a timing T1 in the calibration phase, the first magnetic pulse MP1 begins falling transition, the trigger signal TGS is activated, and the counter 233 begins counting-up operation. The counter 233 performs the counting-up operation until a timing T3 when the first magnetic pulse MP1 reaches the reference level RLEV. That is, since the comparison signal CS transitions to high level at the timing T3 when the first magnetic pulse MP1 reaches the reference level RLEV, the counter 233 outputs a counting value at the timing T3 as the first counting value CNT1. The latch 234 latches the first counting value CNT1 corresponding to the number of the counting pulses during the first transition time TRT1 as the first digital code DCD1.

At timing T1 in the detection phase, the second magnetic pulse MP2 begins falling transition, the trigger signal TGS is activated, and the counter 233 begins counting-up operation. The counter 233 performs the counting-up operation until a timing T2 when the second magnetic pulse MP2 reaches the reference level RLEV. That is, since the comparison signal CS transitions to high level at the timing T2 when the second magnetic pulse MP2 reaches the reference level RLEV, the counter 233 outputs a counting value at the timing T2 as the second counting value CNT2. The latch 234 latches the second counting value CNT2 corresponding to the number of the counting pulses during the second transition time TRT2 as the second digital code DCD2.

Figure 22:
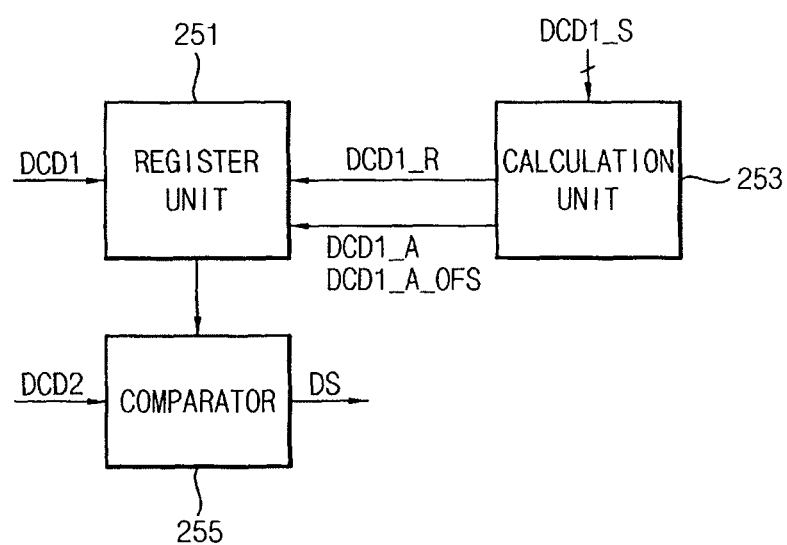
FIG. 22 illustrates an example of the determination unit in FIG. 17.

FIG. 22 illustrates an example of the determination unit in FIG. 17. Referring to FIG. 22, the determination unit 250 may include a register unit 251, a second calculation unit 253, and a digital comparator 255. The register unit 251 stores the first digital code DCD1 in the calibration phase.

When the detection circuit 200 determines whether the contactless IC card 500 is within the communication range of the contactless IC card reader 100 using the plurality of first magnetic pulses MP11_S1, MP11_S2 and MP11_S3 as illustrated in FIG. 15, the second calculation unit 253 receives the first sub-digital codes DCD1_S corresponding to the first sub-counting values CNT1_S. The second calculation unit 253 averages the first sub-digital codes DCD1_S to calculate average value DCD1_A and an offset DCD1_A_OFS, and may provide the average value DCD1_A and an offset DCD1_A_OFS to the register unit 253. In addition, the second calculation unit 253 receives the first sub-digital codes DCD1_S corresponding to the first sub-counting values CNT1_S, and calculates a range DCD1_R of the first digital code. The range DCD1_R of the first digital code is then provided to the register unit 251.

The digital comparator 255 may compare the second digital code DCD2 with one of the first digital code DCD1, the average value DCD1_A of the first sub-digital codes DCD1_S, or the range DCD1_R of the first digital code. The digital comparator 255 outputs the detection signal DS according to the comparison result.

As described with reference to FIGS. 16 through 22, to determine whether the contactless IC card 500 is within the communication coverage of the contactless IC card reader 100, the contactless IC card reader 100 compares a reference level with a rising transition time or a falling transition time of a short magnetic pulse in a calibration phase and a detection phase of a standby mode. The contactless IC card reader 100 may maintain the operation mode of the contactless IC card reader 100 in standby mode or change the operation mode to active mode based on the comparison. Therefore, the contactless IC card reader 100 does not require an analog-to-digital converter and logic circuits and, thus, may be simply implemented. Accordingly, occupied area may be reduced and power consumption may be greatly reduced.

Figure 23:
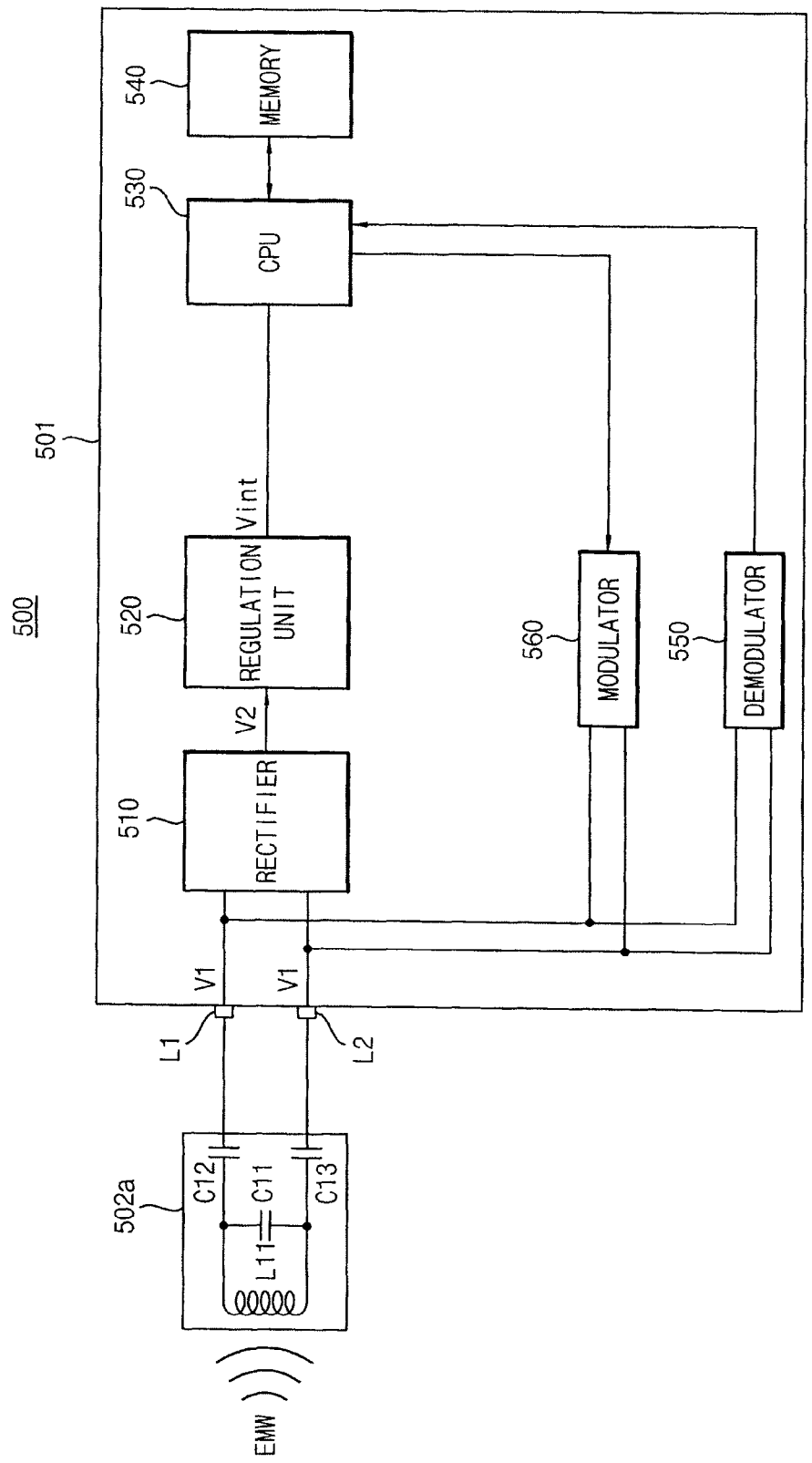
FIG. 23 illustrates an example of the contactless IC card in FIG. 1.

FIG. 23 illustrates an example of the contactless IC card in FIG. 1. Referring to FIG. 23, the contactless IC card 500 may include a resonance unit 502a and a contactless IC card chip 501. The contactless IC card chip 501 may be connected to the resonance unit 502a through first and second power terminals L1 and L2.

The resonance unit 502a may include a resonance circuit including an antenna L11 and a first capacitor C11, second and third capacitors C12 and C13 through which transfers induced voltage induced in response to electromagnetic wave EMW to the first and second power terminals L1 and L2, and a filter including a third capacitor C13. The resonance unit 502a may transfer the induced voltage in response to electromagnetic wave EMW as a first voltage V1 to the contactless IC card chip 501.

The configuration of the resonance unit 502a as illustrated in FIG. 23 is only one example of how the resonance unit may be configured. The resonance unit may have a different configuration in other embodiments.

The contactless IC card chip 501 may receive the first voltage V1 from the resonance unit 502a through the first and second power terminals L1 and L2. The contactless IC card chip 501 may include a rectifier 510, a regulation unit 520, a CPU 530, a memory 540, a demodulator 550, and a modulator 560.

The rectifier 510 rectifies the first voltage V1 to generate a second voltage V2 that is direct-current (DC) voltage.

The regulation unit 520 may generate and provide to the CPU 530, the demodulator 550, and the modulator 560 an internal voltage Vint with a regular level, which is used in the contactless IC card chip 501.

The CPU 530 may control overall operations of the contactless IC card chip 501. When a reception operation is performed, the demodulator 550 may demodulate a signal provided through the first and second power terminals L1 and L2 from the resonance unit 502a to generate input data. The input data may be to the CPU 530, which may store the input data in the memory 540.

When a transmission operation is performed, the CPU 530 may read out output data from the memory 540 and provide the output data to the modulator 560. The modulator 560 may modulate the output data and provide a modulated signal to the first and second power terminals L1 and L2. For example, the modulator 560 may perform a load modulation for the output data to generate the modulated signal.

Figure 24:
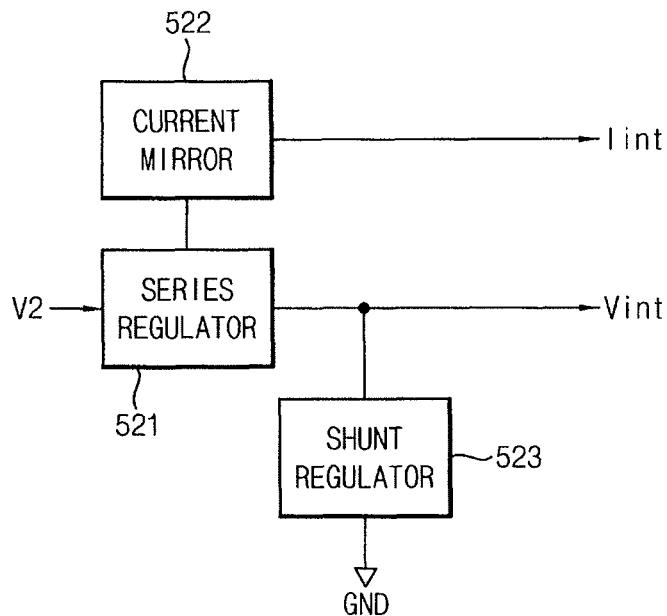
FIG. 24 illustrates an example of the regulation unit in FIG. 20.

FIG. 24 illustrates an example of the regulation unit in FIG. 20. Referring to FIG. 24, the regulation unit 520 may include a series regulator 521, a shunt regulator 523, and a current mirror 524.

The series regulator 521 may receive the second voltage V2 from the rectifier 521 and the shunt regulator 523 may be connected between an output terminal of the series regulator 292 and a ground voltage GND. Thus, the series and shunt regulators 521 and 523 may generate the internal voltage Vint having the regular level, which is usable in the contactless IC card chip 501 using the second voltage V2. The current mirror 522 may generate an internal current Iint having an intensity which is proportional to that of a current flowing through the series regulator 521.

Figure 25:
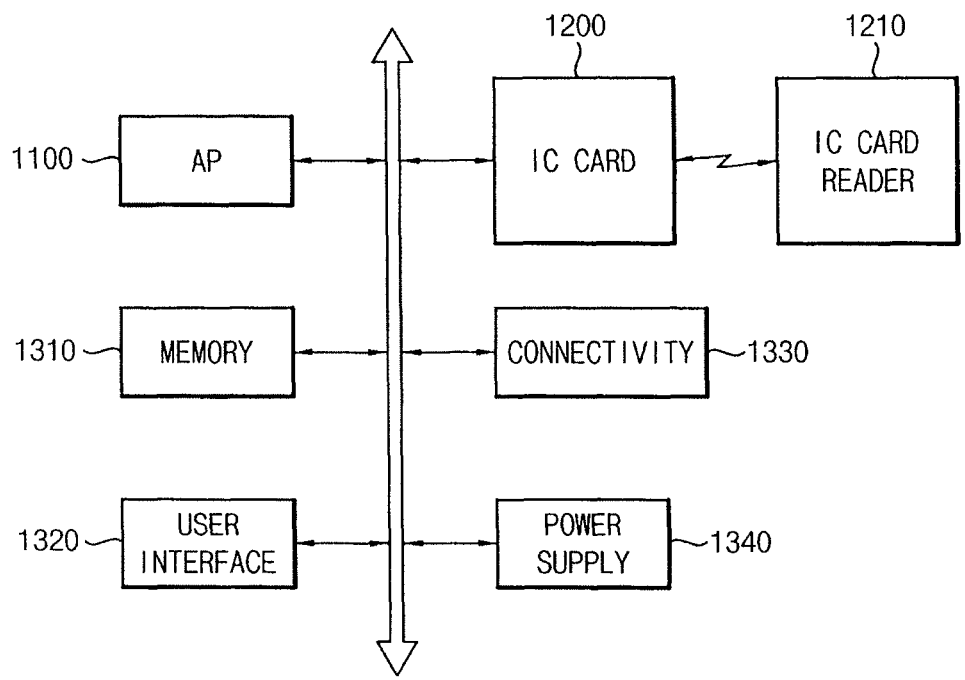
FIG. 25 illustrates an embodiment of a mobile system.

FIG. 25 illustrates an embodiment of a mobile system 1000 which includes an application processor 1100, a contactless IC card 1200, a memory 1310, a user interface 1320, a connectivity unit 1330, and a power supply 1340. According to various embodiments, the mobile system 1000 may be any mobile system such as but not limited to a mobile phone, a smart phone, a personal digital assistant (PDA), a portable multimedia player (PMP), a digital camera, a portable game console, a music player, a camcorder, a video player, a navigation system, etc.

The contactless IC card 1200 may exchange data with the contactless IC card reader 1210. The contactless IC card reader 1210 may employ the contactless IC card reader 100 of FIG. 16, for determining whether the contactless IC card 1200 is within the communication coverage of the contactless IC card reader 1210. The card reader may also compares the reference level with a rising transition time or a falling transition time of one or more short magnetic pulses in a calibration phase and a detection phase of a standby mode.

The contactless IC card reader 1210 may maintain the operation mode of the contactless IC card reader 1210 in standby mode or may change the operation mode to active mode based on the comparison. The contactless IC card reader 1210, therefore, may not require an analog-to-digital converter and logic circuits to maintain or change the operation mode. The contactless IC card reader 1210, thus, may have fewer components that other types of readers. Also, the area occupied by the reader may be significantly reduced and power consumption may be greatly reduced.

The application processor 1100 may execute applications such as but not limited to a web browser, a game application, a video player, etc. In some embodiments, the application processor 1100 may include a single core or multiple cores. For example, the application processor 1100 may be a multi-core processor, such as a dual-core processor, a quad-core processor, a hexa-core processor, etc. According to various embodiments, the application processor 1110 may be coupled to an internal/external cache memory.

The memory device 1310 may store a boot image for booting the mobile system 1000, output data to be transmitted to an external device and input data from the external device. For example, the memory device 1310 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 1130 may include at least one input device (such as a keypad, a touch screen, etc.) and at least one output device (such as a speaker, a display device, etc.). The power supply 1340 may supply a power supply voltage to the mobile system 1000.

The connectivity unit 1330 may perform wired or wireless communication with an external device. For example, the connectivity unit 1330 may perform Ethernet communication, near field communication (NFC), radio frequency identification (RFID) communication, mobile telecommunication, memory card communication, universal serial bus (USB) communication, etc. In some embodiments, connectivity unit 1330 may include a baseband chipset that supports communications, such as global system for mobile communications (GSM), general packet radio service (GPRS), wideband code division multiple access (WCDMA), high speed downlink/uplink packet access (HSxPA), etc.

In some embodiments, the mobile system 1000 may further include a camera image processor (CIS), and/or a storage device, such as a memory card, a solid state drive (SSD), a hard disk drive (HDD), a CD-ROM, etc.

In some embodiments, the mobile system 1000 and/or components of the mobile system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

According to some exemplary embodiments, the contactless IC card reader may greatly reduce the occupied area and the power consumption by detecting the contactless IC card using the transition time of the short magnetic pulses. Various exemplary embodiments may be widely applicable to various contactless IC cards and card systems.

In accordance with one or more embodiments, a method is provided for operating a contactless integrated circuit (IC) card reader which occupies a reduced area and which has low power consumption. In these or other embodiments, a detection circuit of a contactless IC card is provided which has reduced circuit complexity. In these or other embodiments, a contactless IC card reader includes the detection circuit. In accordance with another embodiment, a contactless IC card system is provided which includes the contactless IC card reader.

Many embodiments described herein cover the contactless detection of a card per se, and more specifically a card equipped with an integrated circuit. However, in other embodiments contact less detection may be performed as indicated above for any type of information carrier, e.g., carriers other than credit card size carriers. Examples of these information carriers include magnetic strips or other information-bearing media coupled to a product in a store, a compact disk (CD) storing information files, as well as other media.

Also, while some of the embodiments discussed above cover detection of magnetic pulses, other embodiments may detect pulses generated based on whether an optical media bearing signals and/or other information is within a communication range of a contactless reader.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a contactless integrated circuit (IC) card reader, the method comprising:
    calculating a first transition time of at least one first magnetic pulse having a first transition interval, the first transition time for which the at least one first magnetic pulse transits between a first level and a reference level in the first transition interval in a calibration phase;
    calculating a second transition time of a second magnetic pulse having a second transition interval, the second transition time for which the second magnetic pulse transits between a second level and the reference level in the second transition interval in a detection phase; and
    determining whether a contactless IC card is within a communication range of the contactless IC card reader based on a comparison of the first and second transition times.

2. The method as claimed in claim 1, wherein calculating the first transition time comprises:
    triggering a counting operation at a first staring point of the first transition interval;
    latching a first counting value as a first digital code at a first ending point where the first transition interval reaches the reference level; and
    storing the first digital code in a register.

3. The method as claimed in claim 2, wherein calculating the second transition time comprises:

triggering a counting operation at a second staring point of the second transition interval; and latching a second counting value as a second digital code at a second ending point where the second transition interval reaches the reference level.

4. The method as claimed in claim 3, wherein determining whether the contactless IC card is within the communication range of the contactless IC card reader comprises:

comparing the first digital code and the second digital code; and providing a detection signal based on the comparison of the first digital code and the second digital code, the detection signal indicating whether the contactless IC card is within the communication range of the contactless IC card reader.

5. The method as claimed in claim 3, wherein the first and second digital codes correspond to a number of counting pulses during the first and second transition times, respectively.

6. The method as claimed in claim 5, further comprising:
adjusting a period of the counting pulses.

7. The method as claimed in claim 1, wherein an operation mode of the contactless IC card reader is determined based on the determination of whether the contactless IC card is within the communication range of the contactless IC card reader.

8. The method as claimed in claim 7, further comprising:
changing the operation mode of the contactless IC card reader from a standby mode to an active mode when the contactless IC card is determined to be within the communication range.

9. The method as claimed in claim 1, wherein:
the at least one first magnetic pulse includes a plurality of first magnetic pulses, and calculating the first transition time comprises:
calculating a first sub-transition time from the first level to the reference level of each of the plurality of first magnetic pulses; and averaging the first sub-transition times to provide an average value corresponding to the first transition time.

10. The method as claimed in claim 9, further comprising:
determining an offset based on the average value of the first sub-transition times, the offset corresponding to error range of the first sub-transition times.

11. The method as claimed in claim 1, wherein;
the at least one first magnetic pulse includes a plurality of first magnetic pulses, and calculating the first transition time comprises:
calculating a first sub-transition time from the first level to the reference level of each of the plurality of first magnetic pulses; and providing a range of the first transition time based on distributions of the first sub-transition times.

12. The method as claimed in claim 11, wherein determining whether the contactless IC card is within the communication range of the contactless IC card reader comprises: determining whether the second transition time is within the range of the first transition time.

13. The method as claimed in claim 1, further comprising:
generating the at least one first magnetic pulse based on at least one first original magnetic pulse transmitted through an antenna in the calibration phase, and generating the second magnetic pulse based on at least one second original magnetic pulse transmitted through the antenna in the detection phase, wherein the first level corresponds to a peak level of the first magnetic pulse, and wherein the second level corresponds to a peak level of the second magnetic pulse.

14. The method as claimed in claim 13, further comprising:
converting a level of the first original magnetic pulse in the calibration phase; and filtering the level-converted first original magnetic pulse to provide the first magnetic pulse.

15. The method as claimed in claim 1, further comprising:
generating the at least one first magnetic pulse based on at least one first original magnetic pulse transmitted through an antenna in the calibration phase, and generating the second magnetic pulse based on at least one second original magnetic pulse transmitted through the antenna in the detection phase, wherein the first level corresponds to a bottom level of the first magnetic pulse, and wherein the second level corresponds to a bottom level of the second magnetic pulse.

16. The method as claimed in claim 15, further comprising:
converting a level of the second original magnetic pulse in the detection phase; and filtering the level-converted second original magnetic pulse to provide the second magnetic pulse.

17. A detection circuit of a contactless integrated circuit (IC) card reader, the detection circuit comprising:
a first calculation unit to:
(a) calculate a first transition time of at least one first magnetic pulse having a first transition interval, the first transition time for which the at least one first magnetic pulse transits between a first level and a reference level in the first transition interval, the first calculation unit to latch a first digital code corresponding to the first transition time in a calibration phase, and (b) calculate a second transition time of a second magnetic pulse having a second transition interval, the second transition time for which the second transition time transits between a second level and the reference level in the second transition interval, the first calculation unit to latch a second digital code corresponding to the second transition time in a detection phase; and a determination unit to output a detection signal based on a comparison of the first and second transition times, the detection signal indicating whether a contactless IC card is within a communication range of the contactless IC card reader.

18. The detection circuit as claimed in claim 17, wherein the first calculation unit comprises:
a level detector to activate a trigger signal at start points of the first and second transition intervals, respectively;

a comparator to compare the reference level with each of the first and second magnetic pulses to output a comparison signal;

a counter to perform a counting operation in the first transition interval and the second transition interval to provide first and second counting values, respectively; and a latch to latch the first and second counting values as the first and second digital codes, respectively in response to a transition of the comparison signal.

19. The detection circuit as claimed in claim 17, wherein the determination unit comprises:
a second calculation unit to calculate an average value, an offset, and a range of a first sub-digital codes based on the first sub-digital codes corresponding to first sub-transition times of a plurality of first magnetic pulses;

a register unit to store the first digital code, the average value, the offset, and the range of the first sub digital codes; and a digital comparator to compare the second digital code with one of the first digital code, the average value, or the range of the first sub-digital codes to provide the detection signal.

20. The detection circuit as claimed in claim 17, further comprising:
a regeneration block to convert a level of a first original magnetic pulse and to filter the level-converted first original magnetic pulse to provide the first magnetic pulse in the calibration phase,
wherein the regeneration block is further to convert a level of a second original magnetic pulse and to filter the level-converted a second original magnetic pulse to provide the second magnetic pulse in the detection phase, and
wherein the first original magnetic pulse is transmitted periodically through an antenna, and the second original magnetic pulse is transmitted through the antenna.

21. The detection circuit as claimed in claim 17, wherein:
the first level corresponds to a peak level of the first magnetic pulse, and
the second level corresponds to a peak level of the second magnetic pulse.

22. The detection circuit as claimed in claim 17, wherein:
the first level corresponds to a bottom level of the first magnetic pulse, and the second level corresponds to a bottom level of the second magnetic pulse.

23. A contactless integrated circuit (IC) card reader, comprising:
a detection circuit to generate a detection signal based on a comparison of a first transition time of a first magnetic pulse having a first transition interval and a second transition time of a second magnetic pulse having a second transition interval; and
a processor to determine an operation mode of the contactless IC card reader, the operation mode corresponding to one of a standby mode or an active mode, wherein:
the first magnetic pulse transits between a first level and a reference level for the first transition time of the first transition interval in a calibration phase,
the second magnetic pulse transits between a second level and the reference level for the second transition time of the second transition interval in a detection phase,
the detection signal indicates whether a contactless IC card is within a communication range of the contactless IC card reader, and
the second magnetic pulse has an amplitude that varies according to whether the contactless IC card is within the communication range of the contactless IC card reader.

24. The contactless IC card reader as claimed in claim 23, wherein the processor adjusts the reference level.

25. A contactless integrated circuit (IC) card system comprising:
a contactless IC card; and
a contactless IC card reader to exchange data with the contactless IC card within a communication range, the contactless IC card reader comprising:
a detection circuit to generate a detection signal based on a comparison of a first transition time of a first magnetic pulse having a first transition interval and a second transition time of a second magnetic pulse having a second transition interval; and
a processor to determine an operation mode of the contactless IC card reader according to the detection signal, the operation mode corresponding to one of a standby mode or an active mode, wherein:
the first magnetic pulse transits between a first level and a reference level for the first transition time of the first transition interval in a calibration phase,
the second magnetic pulse transits between a second level and the reference level for the second transition time of the second transition interval in a detection phase,
the detection signal indicates whether a contactless IC card is within a communication range of the contactless IC card reader, and
the second magnetic pulse has an amplitude that varies according to whether the contactless IC card is within the communication range of the contactless IC card reader.

26. A method for performing contactless detection of information, the method comprising:
determining a first transition time of at least one first magnetic pulse having a first transition interval;
determining a second transition time of a second magnetic pulse having a second transition interval; and
determining whether an information carrier is within a communication range of a contactless reader based on the first and second transition times, wherein:
the at least one first magnetic pulse changes from a first level to a second level within the first transition time, and
the second magnetic pulse changes from the first level to a third level within the second transition time.

27. The method as claimed in claim 26, wherein the information carrier includes an integrated circuit coupled to a card.

28. The method as claimed in claim 26, wherein:
the information carrier is determined to be within the communication range of the contactless reader based on a difference between the second and third levels.

29. The method as claimed in claim 26, wherein:
the first transition time is determined during a calibration phase, and
the second transition time is determined during a detection phase.

30. The method as claimed in claim 26, further comprising:
changing a mode of operation of the contactless reader when the information carrier is within the communication range of the contactless reader.

* * * * *